United States Patent
Liu et al.

(10) Patent No.: US 10,451,804 B2
(45) Date of Patent: *Oct. 22, 2019

(54) INTEGRATED POLARIZATION SPLITTER AND ROTATOR INCLUDING A THIRD REGION FOR TUNING THE POLARIZATION DEPENDENT LOSS OF OUTPUT TRANSVERSE ELECTRIC SIGNALS

(71) Applicant: Elenion Technologies, LLC, New York, NY (US)

(72) Inventors: Yang Liu, Elmhurst, NY (US); Yangjin Ma, Brooklyn, NY (US); Michael J. Hochberg, New York, NY (US)

(73) Assignee: Elenion Technologies, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/840,500

(22) Filed: Dec. 13, 2017

(65) Prior Publication Data

US 2018/0100969 A1  Apr. 12, 2018

Related U.S. Application Data

(63) Continuation of application No. 15/048,107, filed on Feb. 19, 2016, now Pat. No. 9,874,696.

(Continued)

(51) Int. Cl.
*G02B 6/14* (2006.01)
*G02B 6/27* (2006.01)
(Continued)

(52) U.S. Cl.
CPC .......... *G02B 6/2726* (2013.01); *G01J 3/0218* (2013.01); *G02B 6/126* (2013.01);
(Continued)

(58) Field of Classification Search
CPC .... H04B 10/2581; H04J 14/06; G01J 3/0218; G02B 6/2726; G02B 6/2766; G02B 6/2773; G02B 6/2793
(Continued)

(56) References Cited

U.S. PATENT DOCUMENTS 5,493,624 A   2/1996   Thompson
7,200,308 B2  4/2007   Hochberg
(Continued)

FOREIGN PATENT DOCUMENTS

CN      103412367 A   11/2013

OTHER PUBLICATIONS

Dai et al.; "Mode Conversion in Tapered Submicron Silicon Ridge Optical Waveguides"; Optics Express, vol. 20, No. 12, Jun. 4, 2012 (15 pages).
(Continued)

*Primary Examiner* — Que Tan Le
(74) *Attorney, Agent, or Firm* — Stratford Managers Corporation

(57) ABSTRACT

An integrated polarization splitter and rotator (PSR) employs the TE0 and TE1 modes of propagating light, rather than the TE0 and TM0 modes used in conventional prior art PSR. The integrated PSR exhibits appreciably flatter wavelength response because it does not require a directional coupler to de-multiplex incoming polarizations. The PSR allows tuning of the TM0 loss to reduce polarization dependent loss (PDL). This integrated polarization splitter and rotator is applicable to all integrated platforms including Silicon-on-Insulator (SOI) and III-V semiconductor compound systems. The PSR may be very compact ($12 \times 2$ $\mu m^2$), and provides low loss (<0.3 dB across the C-band) and ultra-broadband operation. The PSR also affords better control of polarization dependent losses.

20 Claims, 26 Drawing Sheets

Related U.S. Application Data

(60) Provisional application No. 62/132,742, filed on Mar. 13, 2015, provisional application No. 62/118,420, filed on Feb. 19, 2015.

(51) Int. Cl.
*G01J 3/02* (2006.01)
*G02B 6/126* (2006.01)
*G02B 6/30* (2006.01)
*G02B 6/12* (2006.01)

(52) U.S. Cl.
CPC ......... *G02B 6/2766* (2013.01); *G02B 6/2773* (2013.01); *G02B 6/2793* (2013.01); *G02B 6/30* (2013.01); *G02B 2006/12142* (2013.01)

(58) Field of Classification Search
USPC ...................................................... 250/225
See application file for complete search history.

(56) References Cited

U.S. PATENT DOCUMENTS

| | | | |
|---|---|---|---|
| 7,339,724 B2 | 3/2008 | Hochberg | |
| 7,424,192 B2 | 9/2008 | Hochberg | |
| 7,480,434 B2 | 1/2009 | Hochberg | |
| 7,643,714 B2 | 1/2010 | Hochberg | |
| 7,760,970 B2 | 7/2010 | Baehr-Jones | |
| 7,894,696 B2 | 2/2011 | Baehr-Jones | |
| 8,031,985 B2 | 10/2011 | Hochberg | |
| 8,067,724 B2 | 11/2011 | Hochberg | |
| 8,098,965 B1 | 1/2012 | Baehr-Jones | |
| 8,203,115 B2 | 6/2012 | Hochberg | |
| 8,237,102 B1 | 8/2012 | Baehr-Jones | |
| 8,258,476 B1 | 9/2012 | Baehr-Jones | |
| 8,270,778 B2 | 9/2012 | Hochberg | |
| 8,280,211 B1 | 10/2012 | Baehr-Jones | |
| 8,311,374 B2 | 11/2012 | Hochberg | |
| 8,340,486 B1 | 12/2012 | Hochberg | |
| 8,380,016 B1 | 2/2013 | Hochberg | |
| 8,390,922 B1 | 3/2013 | Baehr-Jones | |
| 8,798,406 B1 | 8/2014 | Hochberg | |
| 8,818,141 B1 | 8/2014 | Hochberg | |
| 8,855,449 B1 | 10/2014 | Roth | |
| 8,873,899 B2 | 10/2014 | Anderson | |
| 9,915,781 B1 * | 3/2018 | Lin | G02B 6/126 |
| 2009/0022444 A1 | 1/2009 | Chen | |
| 2010/0303469 A1 | 12/2010 | Barton | |
| 2013/0156361 A1 | 6/2013 | Kojima | |
| 2014/0133796 A1 | 5/2014 | Dong | |
| 2014/0178005 A1 | 6/2014 | Zhang | |
| 2014/0314367 A1 | 10/2014 | Kojima | |

OTHER PUBLICATIONS

Dai et al.; "Novel Concept for Ultracompact Polarization Splitter-Rotator Based on Silicon Nanowires"; Optics Express, vol. 19, No. 11, May 23, 2011 (10 pages).
Sacher et al.; "Polarization Rotator-Splitters and Controllers in a Si3N4—on-SOI Integrated Photonics Platform"; Optics Express, vol. 22, No. 9, May 5, 2014 (8 pages).
Sacher et al.; "Polarization Rotator-Splitters in Standard Active Silicon Photonics Platforms"; Optics Express, vol. 22, No. 4, Feb. 24, 2014 (10 pages).
Liu et al.; "Silicon Mod-MUX-Ring Transmitter with 4 Channels at 40 Gb/s"; Optics Express, vol. 22, No. 13, Jun. 30, 2014 (8 pages).
Ding et al.; "Wideband Polarization Splitter and Rotator with Large Fabrication Tolerance and Simple Fabrication Process"; Optical Society of America, vol. 38, No. 8, Apr. 15, 2013 (3 pages).
International Search Report, PCT/US2016/018793, dated May 2, 2016 (2 pages).
Written Opinion of the International Searching Authority, PCT/US2016/018793, dated May 2, 2016 (4 pages).

* cited by examiner

INTEGRATED POLARIZATION SPLITTER AND ROTATOR INCLUDING A THIRD REGION FOR TUNING THE POLARIZATION DEPENDENT LOSS OF OUTPUT TRANSVERSE ELECTRIC SIGNALS

CROSS-REFERENCE TO RELATED APPLICATIONS

This application is a continuation of U.S. patent application Ser. No. 15/048,107, filed Feb. 19, 2016, now allowed, which claims priority to U.S. Provisional Application No. 62/132,742, filed Mar. 15, 2015 and U.S. Provisional Application No. 62/118,420, filed Feb. 19, 2015, each of which is hereby incorporated by reference herein in its entirety.

FIELD OF THE INVENTION

The invention relates to optical waveguide devices and particularly to optical waveguide devices that employ polarization splitters and rotators.

BACKGROUND OF THE INVENTION

Polarization handling, including splitting and rotation of optical modes, is an important topic in integrated optics, including systems that transmit optical signals over optical fibers.

For coherent transmission, dual polarization division multiplexing (DPDM) helps to increase the bandwidth by a factor of two. DP-QPSK is one of the most important modulation mechanisms for long-haul coherent transmission. A polarization splitter and rotator (PSR) is one of the fundamental building blocks of a DP-QPSK transceiver. In order to launch two polarizations from a photonic integrated circuit (PIC) to an optical fiber, a PSR is required to multiplex polarizations on the transmission (TX) side. A PSR can also de-multiplex polarizations at the receiver (RX) side to ensure the PIC receives only light of a single polarization.

Also known in the prior art is Thompson, U.S. Pat. No. 5,493,624, issued Feb. 20, 1996, which is said to disclose an integrated optics polarization state converter that comprises optically in series a first $TM_0$ to $TM_1$ mode converter that is substantially transparent to $TE_0$, a concatenation of total internal reflectors and a second $TM_0$ to $TM_1$ converter, similarly substantially transparent to $TE_0$, which is connected the way round so as to operate as a $TM_1$ to $TM_0$ converter. Each $TM_0$ to $TM_1$ converter may comprise a tandem arrangement of a 2×2 $TE_0/TM_0$ polarization beam splitting coupler and a mismatched, 3 dB maximum, 2×2 beam splitting coupler. The place of the $TM_0$ to $TM_1$ converters substantially transparent to $TE_0$ may be taken by $TE_0$ to $TE_1$ converters substantially transparent to $TM_0$.

Also known in the prior art is Roth, U.S. Pat. No. 8,855,449, issued Oct. 7, 2014, which is said to disclose embodiments of an invention that enable polarization diversity using a more general component than current polarization splitter and rotator solutions. Devices such as an optical receiver, transmitter or duplexer may utilize polarization diversity to efficiently process incoming signals regardless of the signal's polarization. Embodiments of the invention may be described as enabling polarization diversity via an adiabatic waveguide polarization converter. When utilized in an optical system of discrete components or in a photonic integrated circuit (PIC), this adiabatic waveguide polarization converter may receive an unknown single-mode polarization of light. This light may, for example, originate from a remote location and come through a single mode fiber. As described in further detail herein, embodiments of the invention reduce the requirements and component complexity for polarization handling for polarization diversity systems. By reducing the component complexity, insertion loss is reduced, device footprint is reduced, and device reliability and tolerances may be improved.

TM0-TE1 tapers have been reported in publications such as D. Dai and J. E. Bowers, "Novel concept for ultracompact polarization splitter-rotator based on silicon nanowires," Opt. Express 19, 10940-10949 (2011) and D. Dai, Y. Tang, and J. E. Bowers, "Mode conversion in tapered submicron silicon ridge optical waveguides," Opt. Express 20, 13425-13426 (2012), but those adiabatic tapers usually have long device lengths.

Y-junctions used to split both TE0 and TE1 has been reported in in various publications, including the Dai and Bowers 2011 paper and Y. Ding, H. Ou, and C. Peucheret, "Wideband polarization splitter and rotator with large fabrication tolerance and simple fabrication process," Opt. Lett. 38, 1227-1229 (2013).

There is a need for improved integrated polarization splitters and rotators.

SUMMARY OF THE INVENTION

Accordingly the present invention relates to integrated optical apparatus, comprising: a substrate; and a waveguide structure disposed on the substrate.

The waveguide structure comprising: a first port at a first end of said waveguide structure; and second and third ports at a second end of said waveguide structure.

A first region in optical communication with said first port, said first region configured to pass a TE0 optical signal received from said first port as an intermediate TE0 optical signal, and configured to convert a TM0 optical signal received from said first port to an intermediate TE1 optical signal, comprised of first and second out of phase TE0 portions.

A second region in optical communication with said first region and in optical communication with said second and third ports, said second region configured to receive said intermediate TE0 and TE1 signals, configured to split said intermediate TE0 into first and second in phase TE0 portions and said intermediate TE1 signal into the first and second portions out of phase portions, and configured to mix the first portions of the TE0 and TE1 signals to produce a first output TE0 signal at said second port and to mix the second portions of the TE0 and TE1 signals to produce a second output TE0 signal at said third port.

Preferably, a third region is provided between, said first and second regions, for tuning the PDL of the first and second output TE0 signals, the third region including gradually increasing and/or decreasing widths for expanding and/or compressing the intermediate TE0 and TE1 signals.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, which represent preferred embodiments thereof. The drawings are not necessarily to scale, emphasis instead generally being placed upon illustrating the principles of the invention. In the drawings, like numerals are used to indicate like parts throughout the various views.

DETAILED DESCRIPTION

Acronyms

A list of acronyms and their usual meanings in the present document (unless otherwise explicitly stated to denote a different thing) are presented below.
AMR Adabatic Micro-Ring
APD Avalanche Photodetector
ARM Anti-Reflection Microstructure
ASE Amplified Spontaneous Emission
BER Bit Error Rate
BOX Buried Oxide
CMOS Complementary Metal-Oxide-Semiconductor
CMP Chemical-Mechanical Planarization
DBR Distributed Bragg Reflector
DC (optics) Directional Coupler
DC (electronics) Direct Current
DCA Digital Communication Analyzer
DPDM Dual Polarization Division Multiplexing
DP-QPSK Dual Polarization Quadrature Phase Shift Keying
DRC Design Rule Checking
DUT Device Under Test
ECL External Cavity Laser
FDTD Finite Difference Time Domain
FOM Figure of Merit
FSR Free Spectral Range
FWHM Full Width at Half Maximum
GaAs Gallium Arsenide
InP Indium Phosphide
$LiNO_3$ Lithium Niobate
LIV Light intensity(L)-Current(I)-Voltage(V)
MFD Mode Field Diameter
MPW Multi Project Wafer
NRZ Non-Return to Zero
PDL Polarization Dependent Loss
PIC Photonic Integrated Circuits
PSO Particle Swarm Optimization
PSR Polarization Splitter and Rotator
Q Quality factor which can be defined by the relationships $$Q = 2\pi \times \frac{\text{Energy Stored}}{\text{Energy dissipated per cycle}} = 2\pi f_r \times \frac{\text{Energy Stored}}{\text{Power Loss}}.$$

Figure 1:
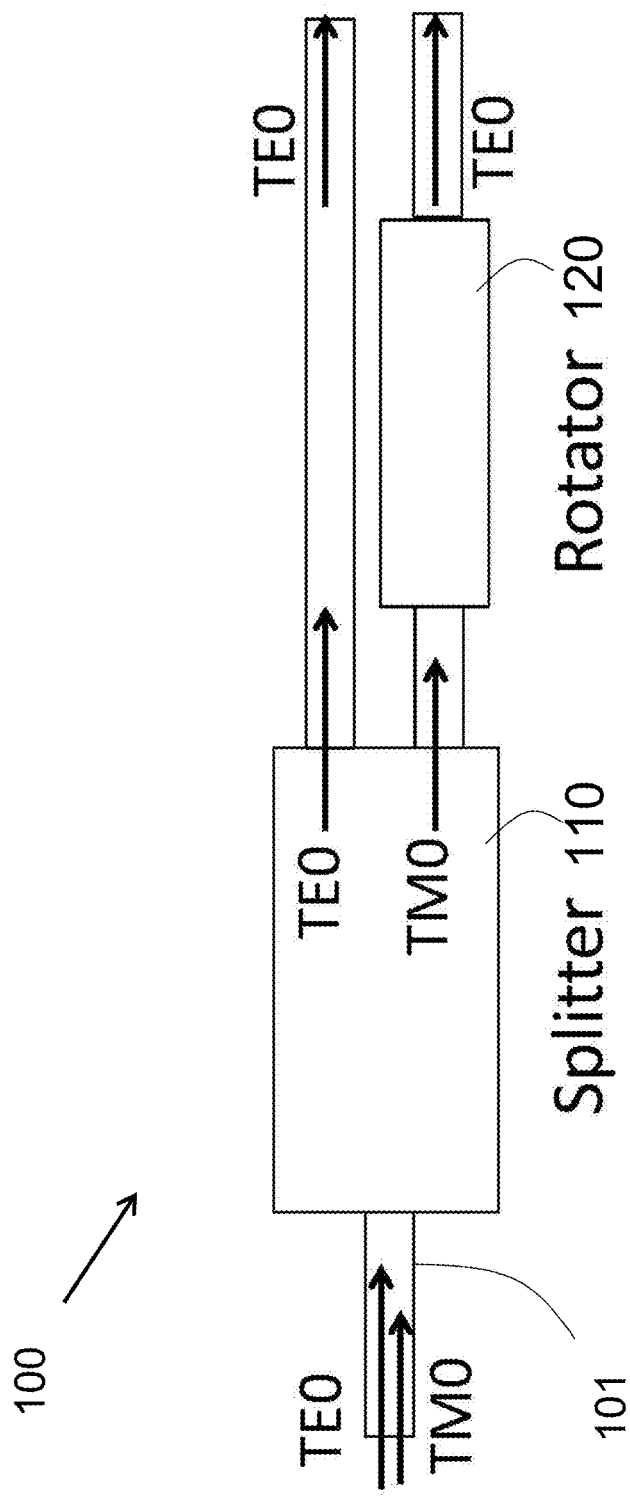
FIG. 1 is a schematic diagram of a conventional polarization splitter and rotator.

QD Quantum Dot
RSOA Reflective Semiconductor Optical Amplifier
RX Receiver
SOI Silicon on Insulator
SEM Scanning Electron Microscope
SMSR Single-Mode Suppression Ratio
TEC Thermal Electric Cooler
TX Transmitter
WDM Wavelength Division Multiplexing The Conventional PSR FIG. 1 is a schematic diagram of a conventional polarization splitter and rotator (PSR) 100. In the conventional PSR 100 illustrated in FIG. 1, the arrows on the left side represent the TE0 mode and TM0 modes (also referred to as TE0 polarization and TM0 polarization) of an optical signal propagating in a waveguide 101 that enters a splitter 110 and are split into separate TM0 and TE0 modes. The TM0 mode then enters a polarization rotator 120 and is then rotated to a TE0 mode. As illustrated on the right side of FIG. 1, two separate TE0 modes are then communicated to other on-chip devices. In particular, this is a reciprocal passive system. It can function as a polarization combiner if light comes in from the right side.

As is well known in the relevant arts, transverse electric (TE) modes are those in which no electric field points in the direction of propagation. These are sometimes called H modes because there is only a magnetic field along the direction of propagation, where H is the conventional symbol for magnetic field.

As is well known in the relevant arts, transverse magnetic (TM) modes are those in which no magnetic field points in the direction of propagation. These are sometimes called E modes because there is only an electric field along the direction of propagation.

For the TM0 mode both the magnetic field and the electric field are transverse to the wave propagation direction, so this mode is also known as the transverse electromagnetic (TEM) mode.

A directional coupler (DC) based structure, as in the aforementioned Dai et al reference may be provided to split the polarizations. The coupling ratio of directional couplers is usually wavelength sensitive. It is hard to get a flat wavelength response across the wavelength range comprising the C band for long-haul optical transmission. This inherent defect degrades the polarization extinction ratio of the system. The splitting efficiency can be viewed as an insertion loss. Moreover, the TM0-TE0 mode rotator induces additional loss.

One can write a transfer matrix for a conventional PSR as shown in Eqn. (1):

$$M = \begin{bmatrix} 1 & 0 \\ 0 & 1 \end{bmatrix} \quad (1)$$

in which the orthogonal bases of polarization are the TE0 and TM0 modes of the waveguide.

45° PSR

Figure 2:
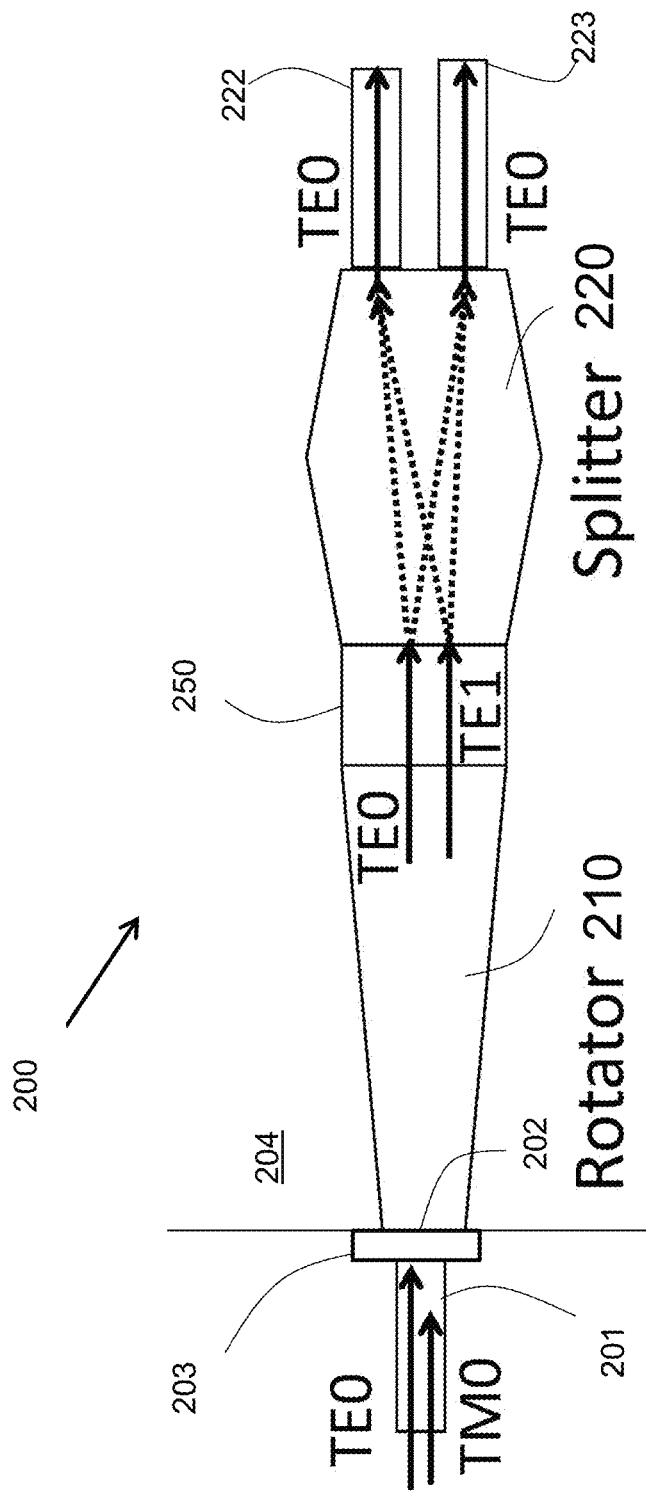
FIG. 2 a schematic diagram of a polarization rotator and splitter that operates according to principles of the invention.

FIG. 2 a schematic diagram of a polarization rotator and splitter (PSR) 200 that operates according to principles of the present invention. As illustrated in the embodiment shown in FIG. 2, the arrows on the left side represent the TE0 mode and TM0 modes of an optical signal propagating in a waveguide, e.g. optical fiber, 201 that enter a rotator 210 at a first port 202, which may be coupled to an edge coupler 203 at an edge of a photonic optical chip (PIC) 204. The PSR 200 may comprise a high-index contrast semiconductor waveguide structure, e.g. a high index contrast silicon waveguide structure, including a tapered rotator 210 and a Y-splitter 220. The high-index contrast semiconductor waveguide structure may be fabricated on a semiconductor substrate, such as silicon, SOI or other suitable Group III/V semiconductor material.

Figure 4B:
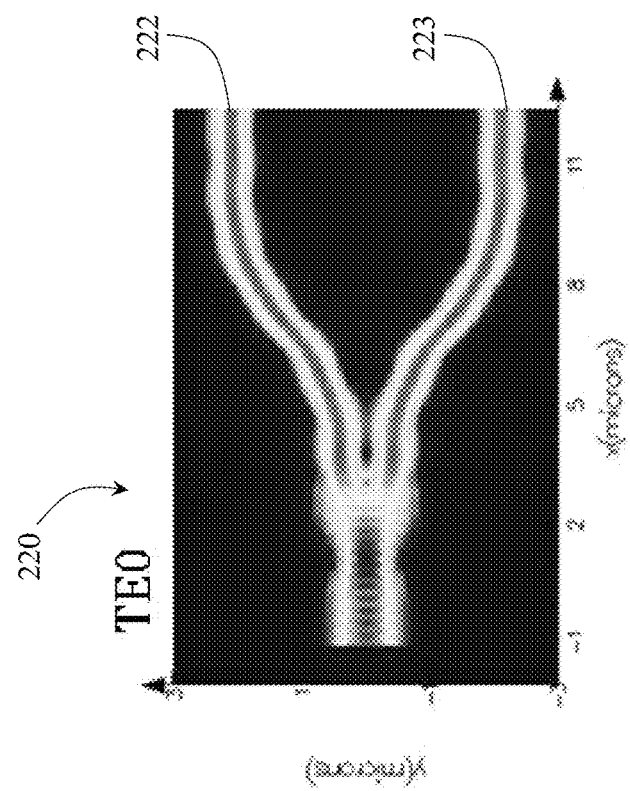
FIG. 4B is a simulated image of a splitter operating at the TE1 mode.

The TM0 mode is rotated into a TE1 mode by a tapered rotator 210. The TE0 mode is left undisturbed. Expressed in mathematical terms, the rotator 210 converts the orthogonal basis of polarizations from TE0+TM0 to TE0+TE1. The TE0 and TE1 modes are then split in splitter 220 which produces two distinct TE0 modes at second and third ports 222 and 223. The splitter 220 functions as a 3 dB divider just as a Y-junction. With reference to FIG. 4B, a first portion of the TE0 mode is transmitted to the second port 222, while a second portion of the TE0 mode is transmitted to the third port 223. Typically, the first and second portions are equal, e.g. 50%; however, any percentage may be provided, depending on the design of the splitter 220 and the requirements of the components on the PIC 204.

In a preferred embodiment, a PDL tuning section 250 may be provided between the rotator 210 and the splitter 220. Typically, the shape of the TE0 and TE1 modes may be deformed, i.e. expanded and/or compressed, by the shape of the PDL tuning section 250, e.g. gradual narrowing to widths less than the wide end of the tapered rotator 210 and the splitter 220 and/or broadening to widths greater than the wide end of the tapered rotator 210 and the splitter 220, whereby the phase may be delayed between the portions of the TE0 and TE1 modes during splitting. The PDL tuning second 250 enables the PSR 200 to generate a specific PDL, a minimum PDL, a higher splitting efficiency, or a minimum PDL with highest achievable splitting efficiency. Ideally, the PDL tuning section 250 is symmetrical, about a longitudinal axis along the direction of light propagation, to provide equal splitting for the TE0 and TE1 modes.

Figure 3A:
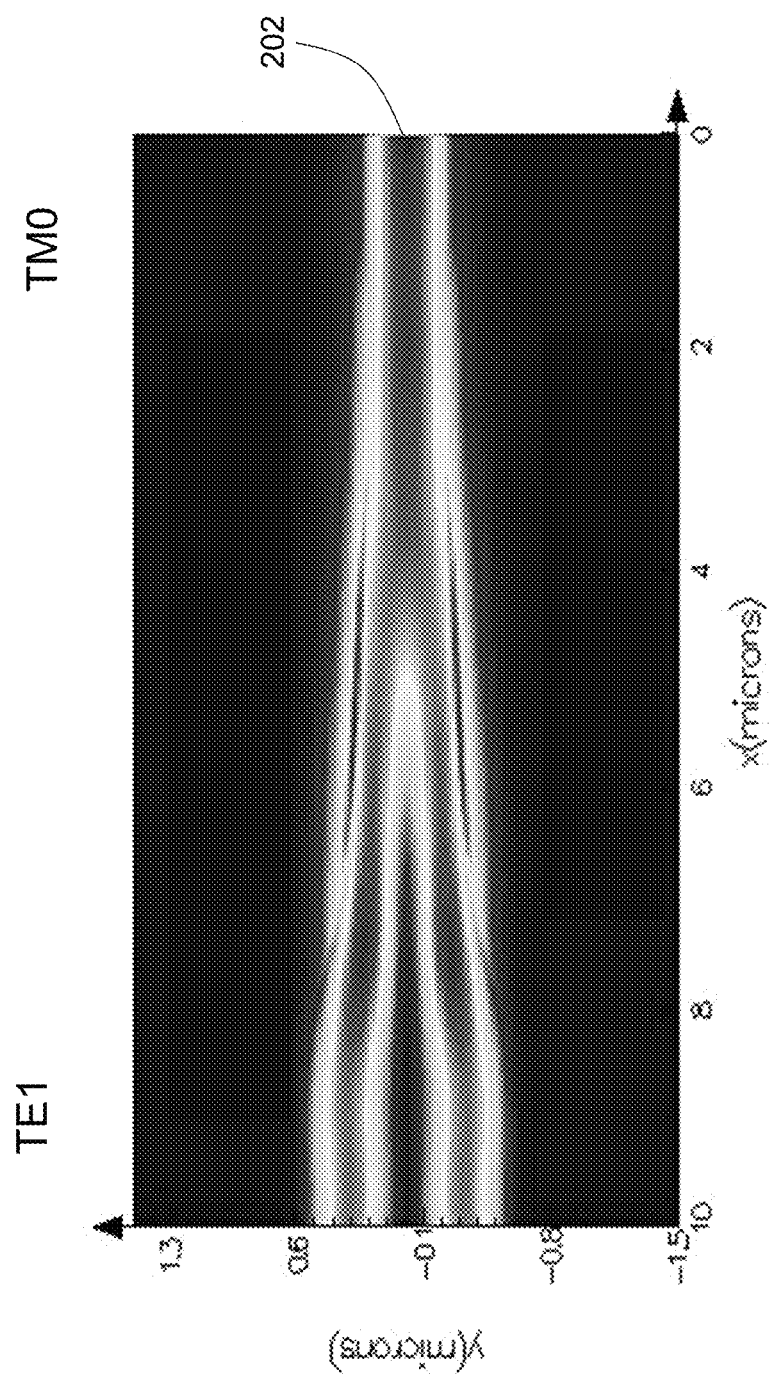
FIG. 3A is a simulation diagram illustrating a TM0-TE1 taper that operates according to principles of the invention.
Figure 4A:
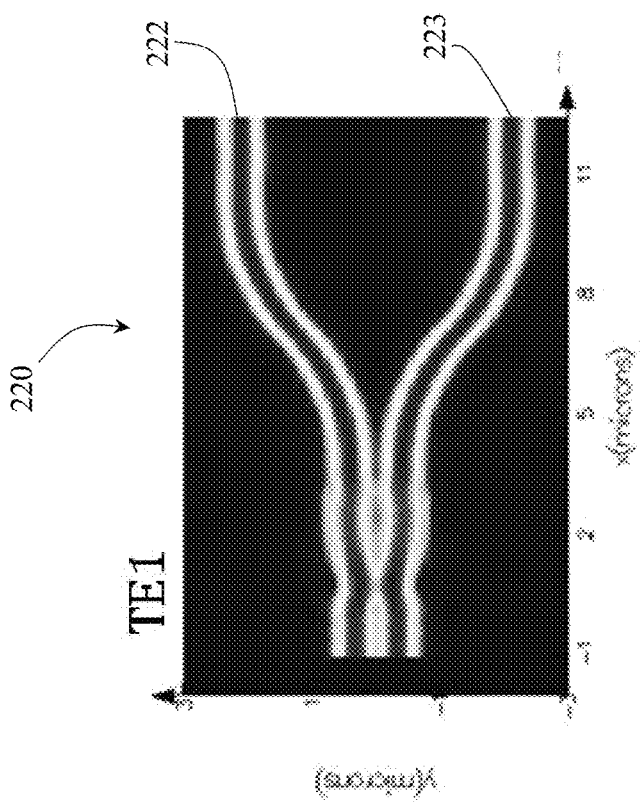
FIG. 4A is a simulated image of a splitter operating at the TE0 mode.

With reference to FIGS. 3A and 4A, the TE1 mode exits the tapered rotator 210 appearing as two superposed TE0 modes, which are out of phase by 180° (π). Similar to the TE0 mode, a first portion of the TE1 mode, i.e. one of the superposed TE0 modes, is transmitted to the second port 222, while a second portion of the TE1 mode, i.e., the other TE0 mode, is transmitted to the third port 223. Accordingly, the first portion of the TE0 mode combines with the first portion of the TE1 mode at the second port 222, and the second portion of the TE0 mode combines with the second portion of the TE1 mode as the third port 223.

In the polarization splitter and rotator 200 of the invention, very broadband performance can be achieved because a directional coupler is absent. The polarization extinction ratio is expected to be high across a wide range of wavelength.

The transfer matrix of this PSR 200 can be written as shown in Eqn. (2):

$$M = \frac{\sqrt{2}}{2} \begin{bmatrix} 1 & -1 \\ 1 & 1 \end{bmatrix} \quad (2)$$

For the TE0 input, the two TE0 output portions have the same amplitude and are in phase, which can be expressed as in Eqn. (3):

$$E_{TE0} = \begin{bmatrix} E_{up} \\ E_{down} \end{bmatrix} = M \begin{bmatrix} E_0 \\ 0 \end{bmatrix} = \frac{\sqrt{2}}{2} \begin{bmatrix} E_0 \\ E_0 \end{bmatrix} \quad (3)$$

For the TM0 input, the two output portions have the same amplitude but are out of phase, which can be expressed as in Eqn. (4):

$$E_{TM0} = \begin{bmatrix} E_{up} \\ E_{down} \end{bmatrix} = M \begin{bmatrix} 0 \\ E_0 \end{bmatrix} = \frac{\sqrt{2}}{2} \begin{bmatrix} -E_0 \\ E_0 \end{bmatrix} \quad (4)$$

In general, any arbitrary input polarization can be considered as a superposition of TE0 and TM0, thus the output can be expressed as in Eqn. (5):

$$E_{Arb} = M \begin{bmatrix} aE_0 \\ bE_0 \end{bmatrix} = aE_{TE0} + bE_{TM0} \quad (5)$$

where a and b are normalized superposition coefficients, such that $a^2+b^2=1$.

In particular, if an input polarization has equal projected component to TE0 and TM0 (45 degree polarized), the output can be completely routed to the bottom branch, because the first portion of the TE0 mode is completely out or phase with the first portion of the TE1 mode, i.e. 180°, and the second portion of the TE0 mode is in phase with the second portion of the TE1 mode, as expressed by Eqn. (6):

$$\begin{bmatrix} E_{up} \\ E_{down} \end{bmatrix} = \frac{1}{\sqrt{2}} E_{TE0} + \frac{1}{\sqrt{2}} E_{TM0} = \begin{bmatrix} 0 \\ E_0 \end{bmatrix} \quad (6)$$

It can also be routed into the top branch of the output if the input light is polarized at an angle of −45 degrees (e.g. equivalent to 315 degrees), because the second portion of the TE0 mode is completely out or phase with the second portion of the TE1 mode, i.e. 180°, and the first portion of the TE0 mode is in phase with the first portion of the TE1 mode, as expressed by Eqn. (7):

$$\begin{bmatrix} E_{up} \\ E_{down} \end{bmatrix} = \frac{1}{\sqrt{2}} E_{TE0} + \frac{1}{\sqrt{2}} E_{TM0} = \begin{bmatrix} E_0 \\ 0 \end{bmatrix} \quad (7)$$

That is the reason that this PSR is called 45 degree PSR. The amount of light transmitted to each of the second and third ports 222 and 223 does not matter, as long as all of the light has the same polarization, e.g. ideally TE0.

The PSR 200 may be completely reciprocal, i.e. light of a single polarization, e.g., TE0, may be launched into the second and third ports 222 and 223, combined by the splitter 220, partially rotated by the tapered rotator 210, and then launched onto an output waveguide, e.g., fiber 201.

FDTD Simulation and PSO Optimization

An analysis of this device was carried using finite-difference time-domain (FDTD) simulation. In performing the analysis, particle swarm optimization (PSO) was coupled with FDTD to optimize the geometry of embodiments of the invention. FDTD software is available from various vendors (FDTD Solutions 8.11 available from Lumerical Solutions, Inc., Suite 300-535 Thurlow Street, Vancouver, BC V6E 3L2, Canada; XFdtd® EM Simulation Software available from Remcom®, 315 South Allen Street, Suite 416, State College, Pa. 16801 USA; and FullWAVE available from Synopsys Optical Solutions Group, 199 S. Los Robles Avenue, Suite 400, Pasadena, Calif. 91101 USA).

FIG. 3A is a simulation diagram illustrating a TM0-TE1 taper that operates according to principles of the invention.

Figure 3B:
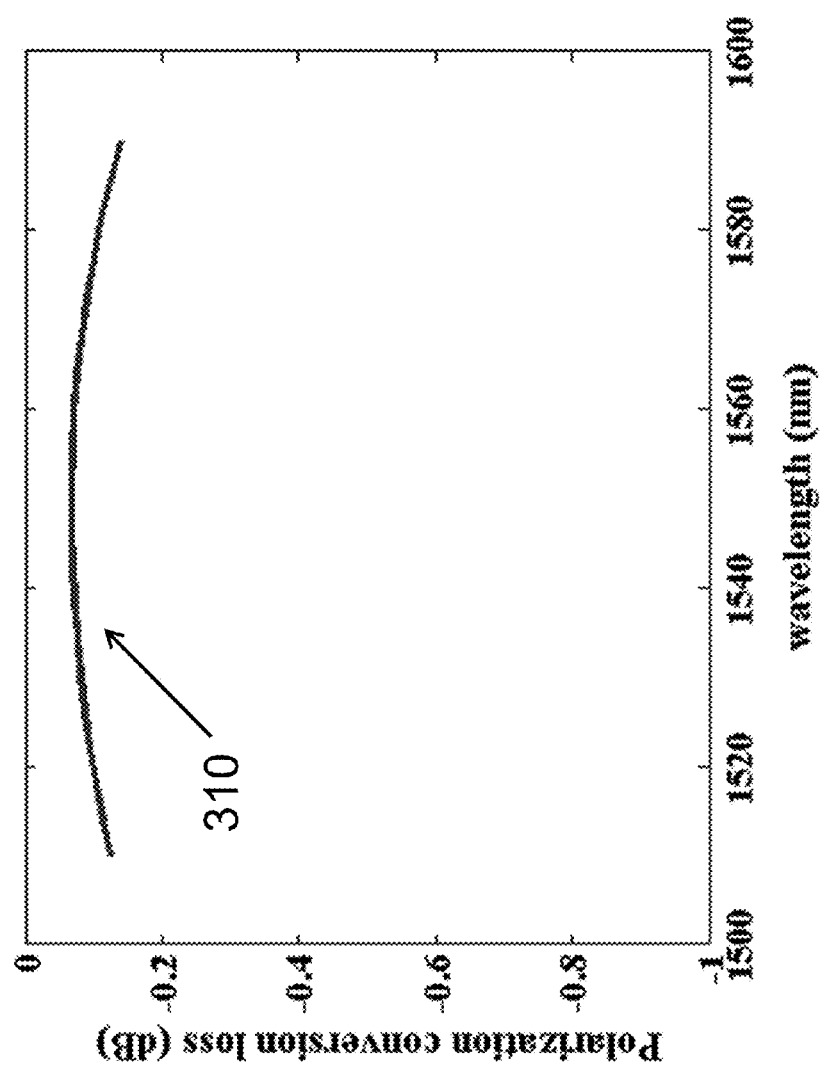
FIG. 3B is a diagram that shows the simulated loss curve in a TM0-TE1 taper as a function of wavelength.

FIG. 3B is a diagram that shows the simulated loss curve 310 in a TM0-TE1 taper as a function of wavelength. The simulated loss of the TM0-TE1 taper is less than 0.2 dB across the C-band.

FIG. 4A is a simulated image of a splitter operating at the TE0 mode.

FIG. 4B is a simulated image of a splitter operating at the TE1 mode.

Figures 4C, 4D:
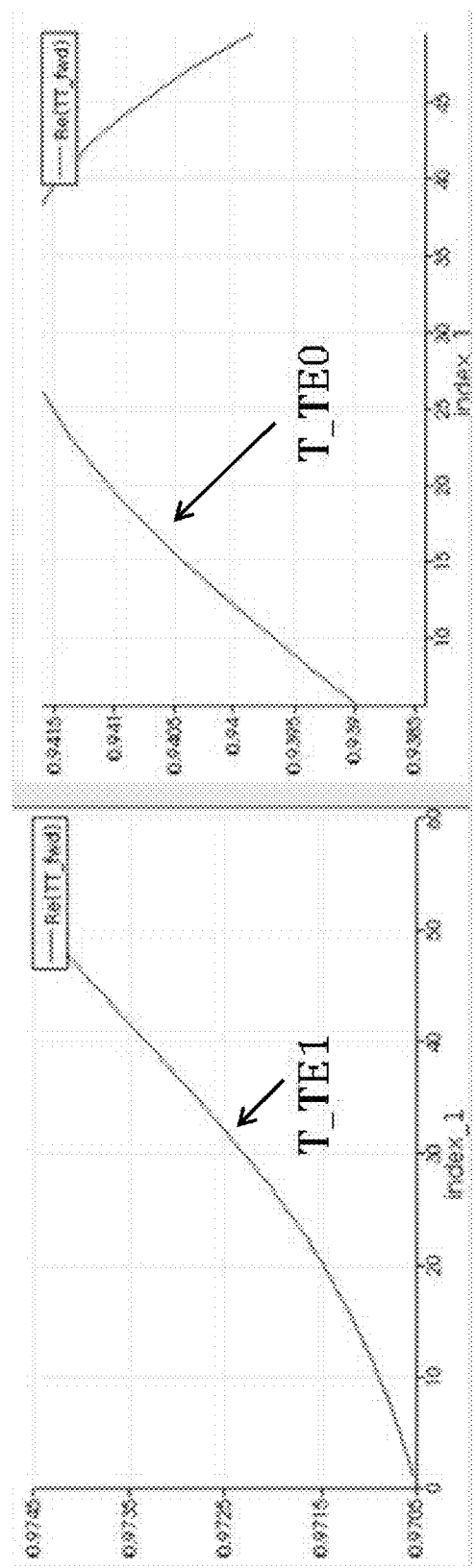
FIG. 4C is a graph of the simulated splitting efficiency of the TE0 mode as a function of index.
FIG. 4D is a graph of the simulated splitting efficiency of the TE1 mode as a function of index.

FIG. 4C is a graph of the simulated splitting efficiency of the TE0 mode as a function of index.

FIG. 4D is a graph of the simulated splitting efficiency of the TE1 mode as a function of index.

The efficiency of TE1-TE0 is greater than 97% (i.e., 0.13 dB insertion loss) across the C band. The splitting efficiency of TE0-TE0 is greater than 94% (i.e., 0.27 dB insertion loss) across the C-band.

Figure 5A:
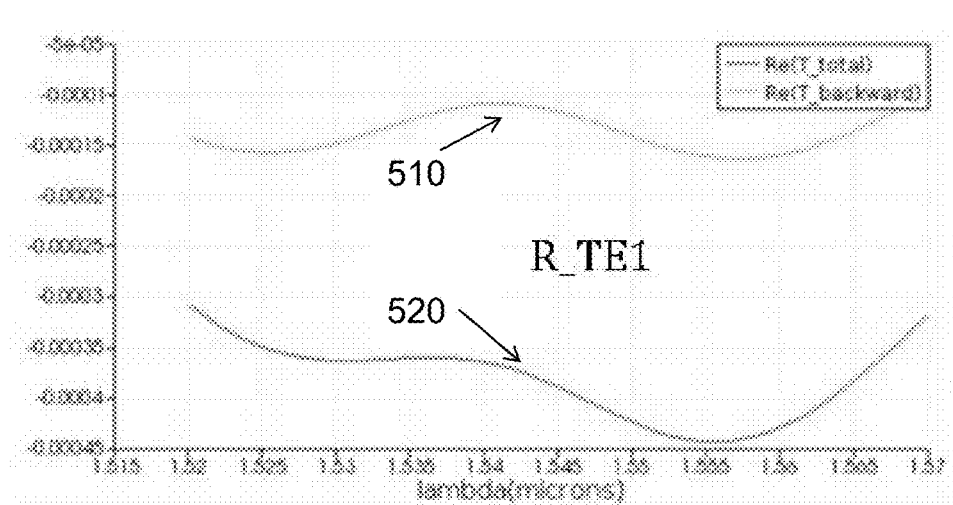
FIG. 5A is a graph of the simulated reflection of TE1 mode as a function of wavelength.

FIG. 5A is a graph of the simulated reflection of TE1 mode as a function of wavelength. In FIG. 5A, the backward reflection is given by curve 510 and the total reflection is given by curve 520. Reflection denoted R_TE1 is less than −33 dB across the C-band.

Figure 5B:
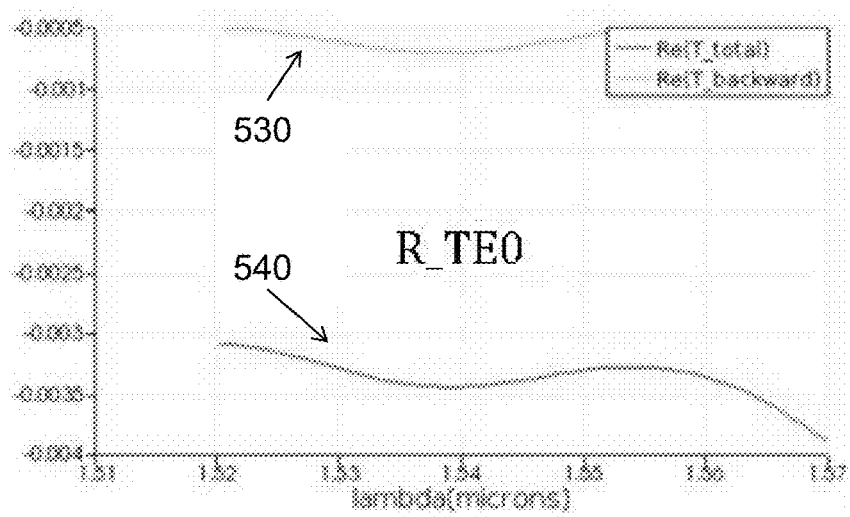
FIG. 5B is a graph of the simulated reflection of TE0 mode as a function of wavelength.

FIG. 5B is a graph of the simulated reflection of TE0 mode as a function of wavelength. In FIG. 5B, the backward reflection is given by curve 530 and the total reflection is given by curve 540. Reflection denoted R_TE0 is less than −23 dB across the C-band.

The PSR device has a very compact footprint. The total length of the PSR is only 12 μm, comprising a length of 9 μm for the TM0-TE1 taper and 3 μm for the TE1-TE0 splitter. The area is 12×2 μm².

The simulation results shown in FIG. 4A through FIG. 4D and FIG. 5A and FIG. 5B describe only one of the many possible embodiments. One can adjust the splitting ratio of TE1 and TE0 in the splitter 220 with assistance of the PSO analysis. One can design a PSR that has complimentary fiber coupling loss to decrease the polarization dependent loss (PDL) of the coherent system.

Application and Reduction to Practice

Figure 6:
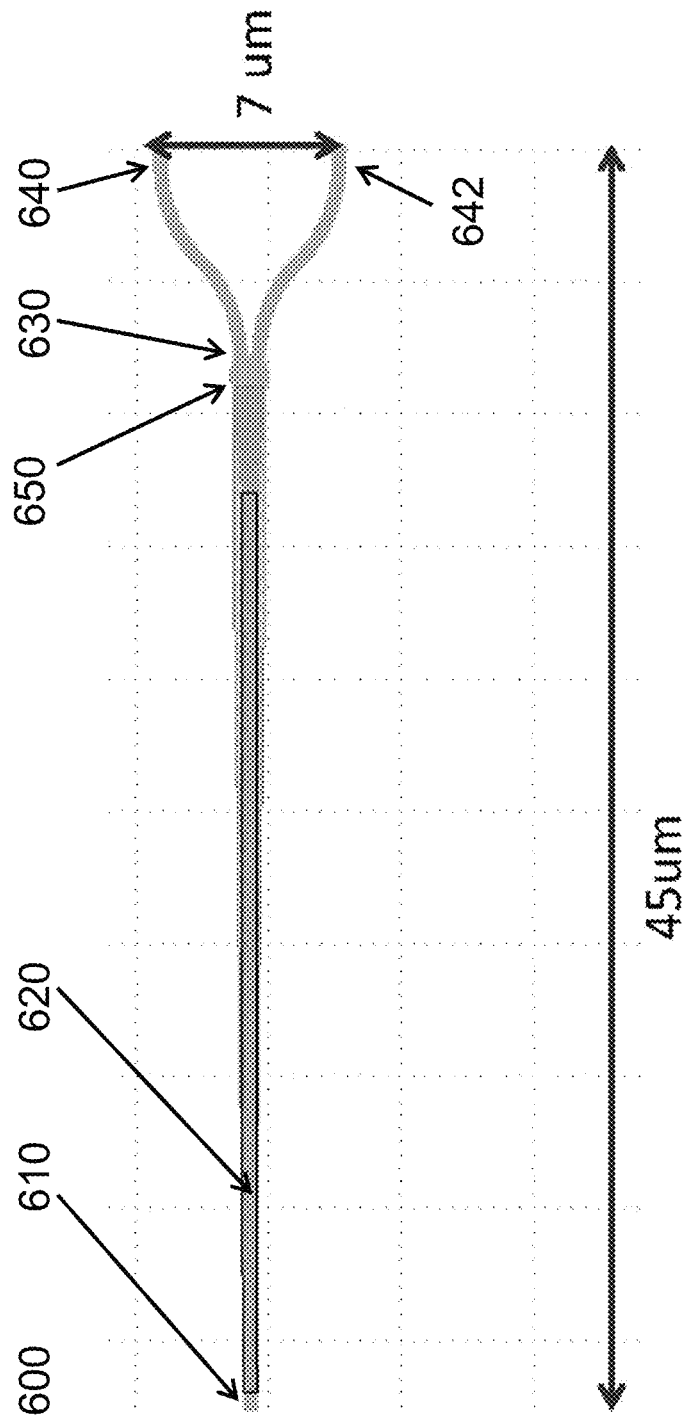
FIG. 6 is a plan view of a first embodiment of an integrated polarization splitter and rotator that operates according to principles of the invention.

FIG. 6 is a plan view of a first embodiment of an integrated polarization splitter and rotator 600 that operates according to principles of the invention. As shown in FIG. 6, the integrated polarization splitter and rotator 600 comprises a waveguide structure, which includes: an input port 610, a tapered rotator 620, a splitter, e.g. Y-splitter, 630, and two output ports 640, 642. The integrated polarization splitter and rotator 600 lacks a directional coupler. In the embodiment shown in FIG. 6, the dimensions of the integrated polarization splitter and rotator 600 may be 45 μm in length by 7 μm in width, but smaller dimensions are possible. This requires an area of 315 μm² or less per integrated polarization splitter and rotator 600.

In a preferred embodiment, a PDL tuning section 650 may be provided between the tapered rotator 620 and the splitter 630. Typically, the shape of the TE0 and TE1 modes may be deformed, i.e., expanded and/or compressed, by the shape of the PDL tuning section 650, e.g. gradual narrowing to widths less than the wide end of the tapered rotator 620 and the splitter 630 and/or broadening to widths greater than the wide end of the tapered rotator 620 and the splitter 630, whereby the phase may be delayed between the portions of the TE0 and TE1 modes during splitting. The PDL tuning second 650 enables the PSR 600 to generate a specific PDL, a minimum PDL, a higher splitting efficiency, or a minimum PDL with highest achievable splitting efficiency. Ideally, the PDL tuning section 650 is symmetrical, about a longitudinal axis along the direction of light propagation, to provide equal splitting for the TE0 and TE1 modes.

Figure 7:
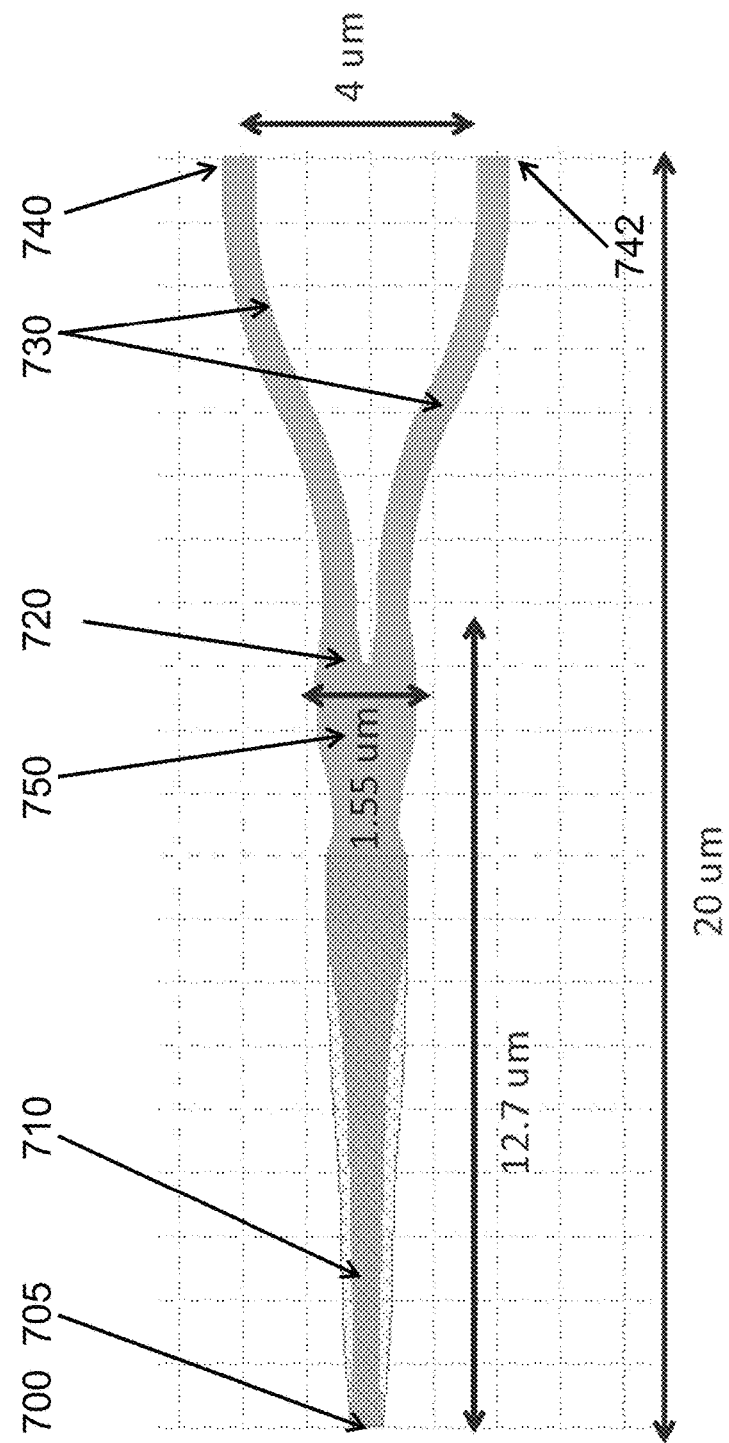
FIG. 7 is a plan view of a second embodiment of an integrated polarization splitter and rotator that operates according to principles of the invention.

FIG. 7 is a plan view of a second embodiment of an integrated polarization splitter and rotator 700 that operates according to principles of the invention. As shown in FIG. 7, the integrated polarization splitter and rotator 700 comprises a waveguide structure including: an input port 705, a tapered rotator 710, a splitter, e.g. Y-splitter, 720, two waveguides 730, and two output ports 740, 742. The integrated polarization splitter and rotator 700 lacks a directional coupler. In the embodiment shown in FIG. 7, the dimensions of the integrated polarization splitter and rotator 700 may be 20 μm length by 4 μm width or less overall. This requires an area of 80 μm² or less per integrated polarization splitter and rotator 700. It is believed that an operational integrated polarization splitter and rotator 700 can be reduced in size to approximately 12.7 μm length by 1.55 μm width overall. This requires an area of 19.685 μm² per integrated polarization splitter and rotator. By reducing the footprint required to construct and operate the integrated polarization splitter and rotator, one can dramatically increase the number of components, and the capacity to receive and transmit optical signals, on a per chip basis.

In a preferred embodiment, a PDL tuning section 750 may be provided between the tapered rotator 710 and the splitter 720. Typically, the shape of the TE0 and TE1 modes may be deformed, i.e. expanded and/or compressed, by the shape of the PDL tuning section 750, e.g. gradual narrowing to widths less than the wide end of the tapered rotator 710 and the splitter 720 and/or broadening to widths greater than the wide end of the tapered rotator 710 and the splitter 720, whereby the phase may be delayed between the portions of the TE0 and TE1 modes during splitting. The PDL tuning second 750 enables the PSR 700 to generate a specific PDL, a minimum PDL, a higher splitting efficiency, or a minimum PDL with highest achievable splitting efficiency. Ideally, the PDL tuning section 750 is symmetrical, about a longitudinal axis along the direction of light propagation, to provide equal splitting for the TE0 and TE1 modes.

One application for the 45° PSR is for use in on-chip polarization insensitive designs. An example is a polarization insensitive wavelength-division multiplexing (WDM) receiver (RX) system.

Figure 8:
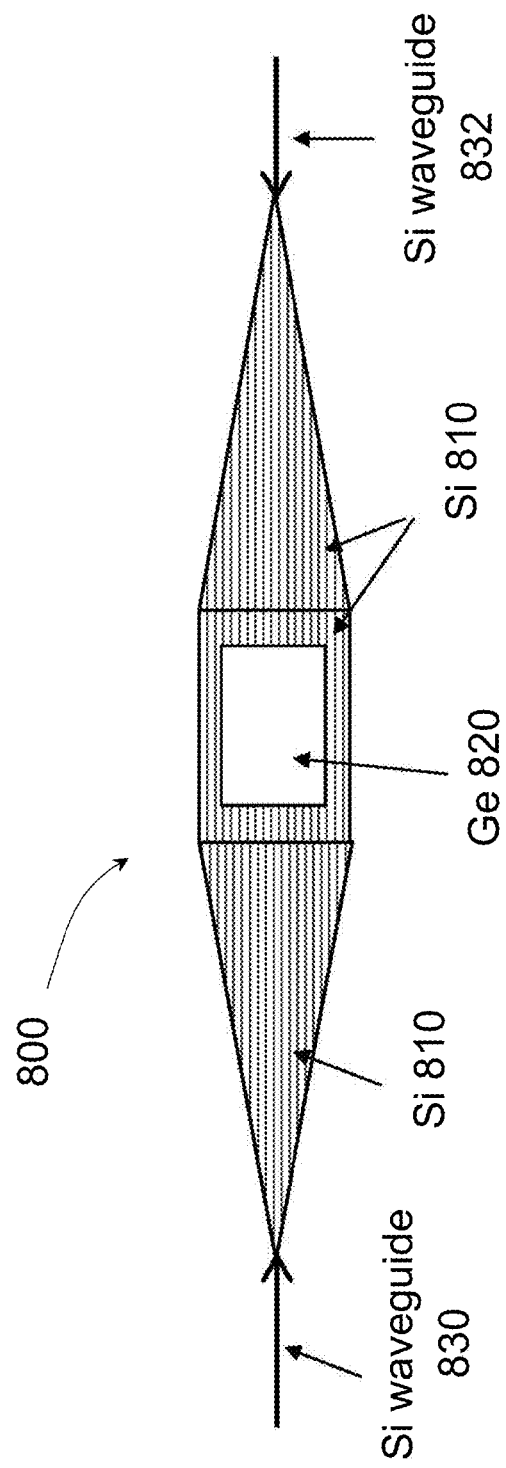
FIG. 8 is a schematic diagram in plan view of a bi-directional photodetector.

FIG. 8 is a schematic diagram in plan view of a bi-directional photodetector 800. In FIG. 8, a semiconductor, e.g. silicon, substrate 810, such as an active device layer in a SOI wafer is provided. An absorber, e.g. germanium, 820 is deposited on the silicon substrate 810. Two optical waveguides 830, 832, such as high index contrast silicon waveguides, provide paths for illumination to reach the photodetector 800 formed by the Si—Ge region from either of two directions. This forms the bi-directional photodetector 800. For a polarization diversity receiver, the second port 640 or 740 is optically coupled to one of the optical waveguides, e.g. 830, while the third port 642 or 742 is optical coupled to the other of the optical waveguides, e.g. 832.

Figure 9:
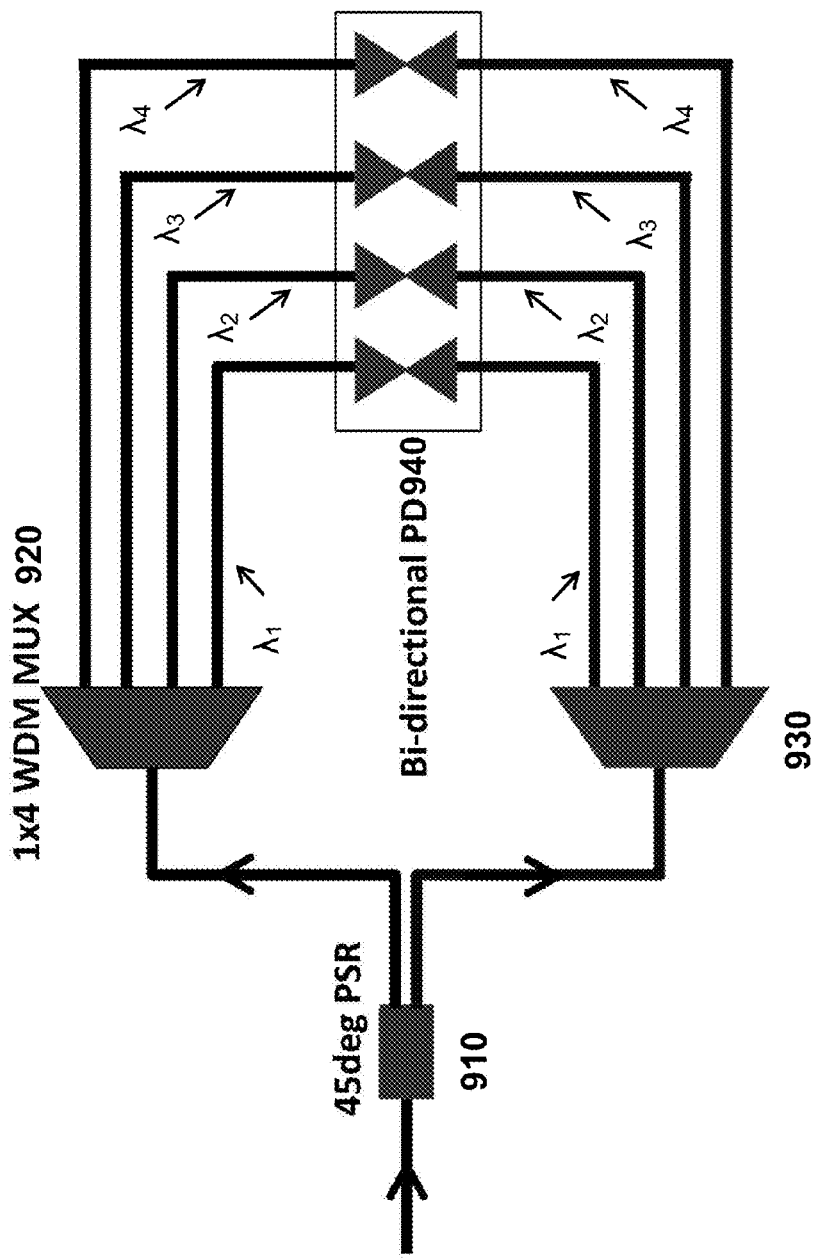
FIG. 9 is a schematic diagram of an illustrative polarization insensitive WDM receiver (RX).

FIG. 9 is a schematic diagram of an illustrative polarization insensitive WDM receiver (RX). As illustrated in the embodiment shown in FIG. 9, a 45° PSR 910 is used to split two orthogonal polarization states and rotate them into TE0 modes, as hereinbefore described. Then each signal is multiplexed by a 1×4 WDM MUX 920, 930. The two TE0 signals separated by the 1×4 WDM MLA 920, 930 into separate constituent wavelength signals, having wavelengths given by $\lambda_1, \lambda_2, \lambda_3,$ and $\lambda_4$, where $\lambda_1 > \lambda_2 > \lambda_3 > \lambda_4$. The various wavelength signals arrive at respective bi-directional PD 940. The bi-directional PD 940 collects a signal from both polarizations for each wavelength, making the entire RX system polarization insensitive. In other embodiments, numbers of discrete wavelengths other than 4 may be used. In different embodiments, using N wavelengths, where N is greater than one, the wavelengths $\lambda_i$ for $1 \le i \le N$ are all different from each other.

FIGS. 10A through FIG. 10H are eye diagrams of an illustrative WDM RX such as that shown in FIG. 9 that was fabricated and tested.

Figure 10A:
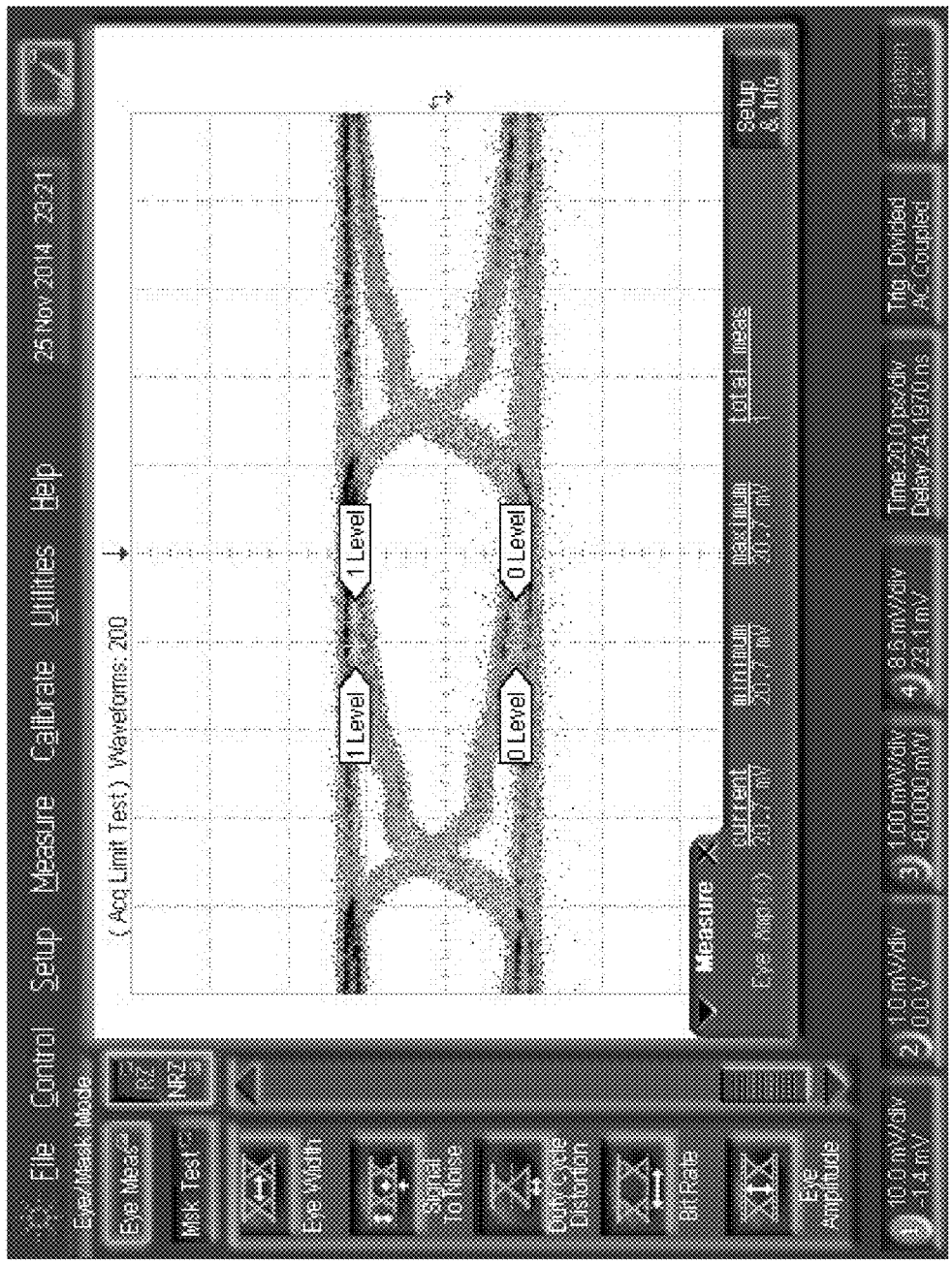
FIG. 10A is an eye diagram recorded under 10 Gbps modulation using 1530.5 nm illumination at maximum Vpp.

FIG. 10A is an eye diagram recorded under 10 Gbps modulation using 1530.5 nm illumination at maximum Vpp.

Figure 10B:
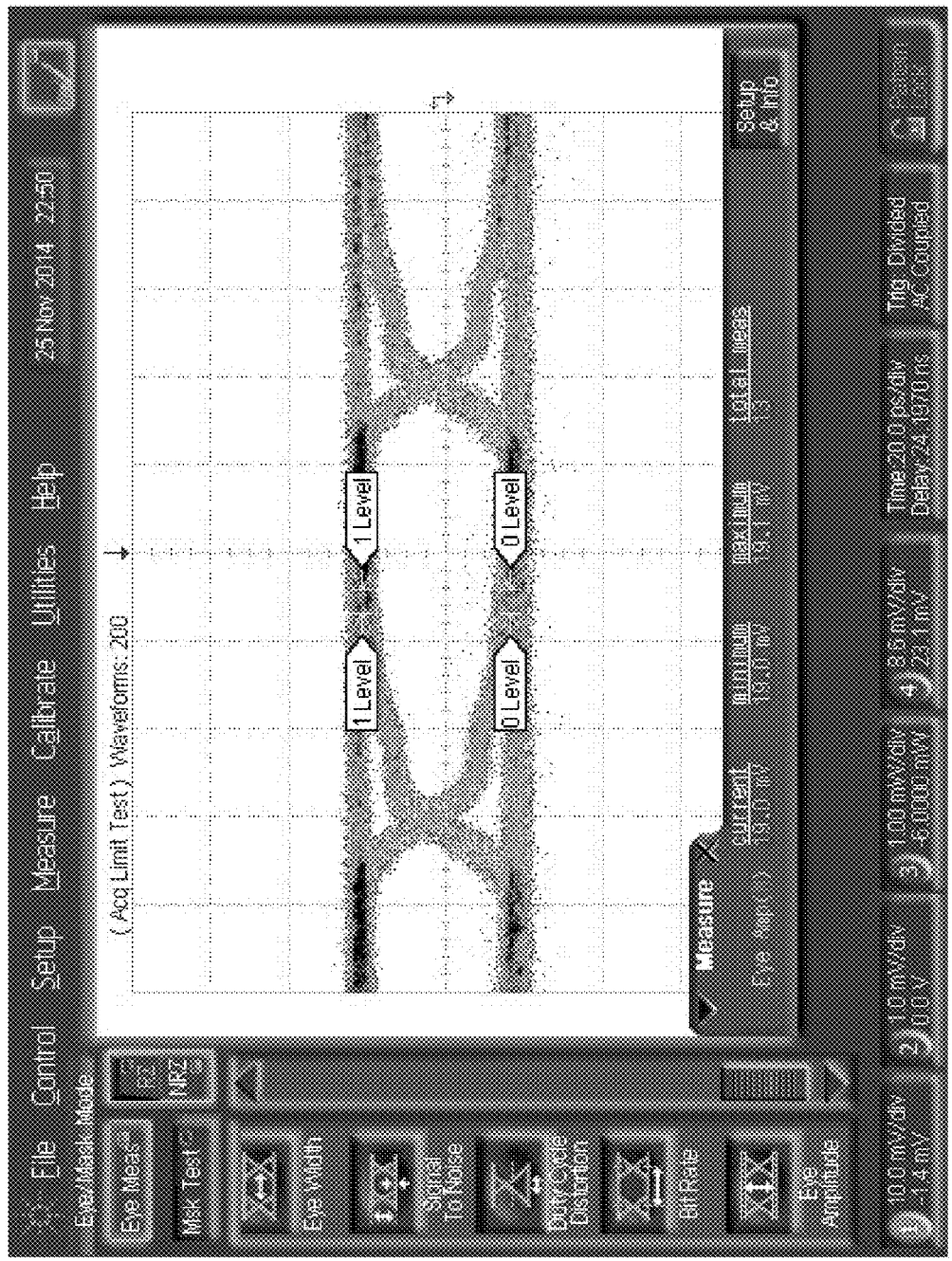
FIG. 10B is an eye diagram recorded under 10 Gbps modulation using 1530.5 nm illumination at minimum Vpp.

FIG. 10B is an eye diagram recorded under 10 Gbps modulation using 1530.5 nm illumination at minimum Vpp.

Figure 10C:
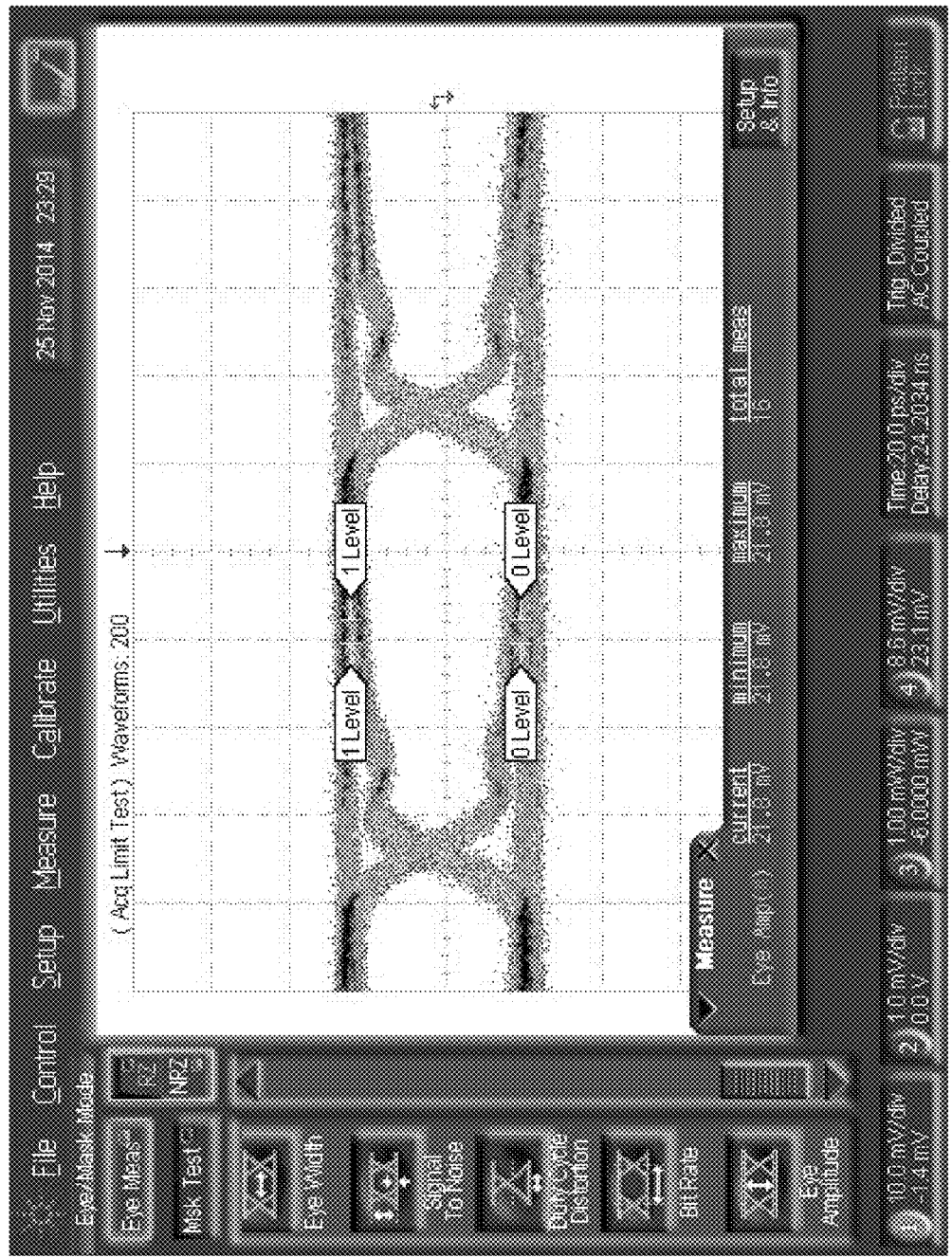
FIG. 10C is an eye diagram recorded under 10 Gbps modulation using 1537 nm illumination at maximum Vpp.

FIG. 10C is an eye diagram recorded under 10 Gbps modulation using 1537 nm illumination at maximum Vpp.

Figure 10D:
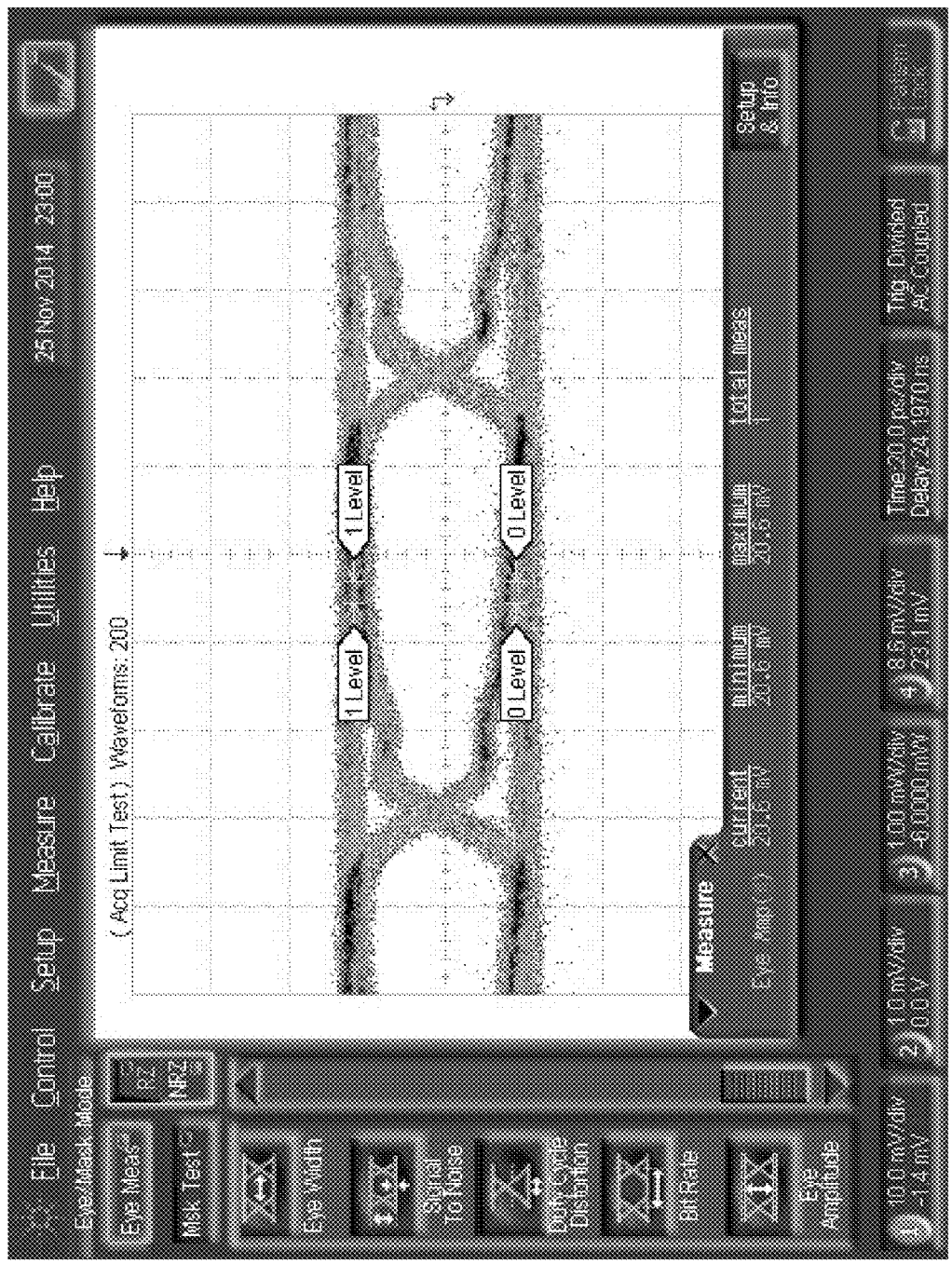
FIG. 10D is an eye diagram recorded under 10 Gbps modulation using 1537 nm illumination at minimum Vpp.

FIG. 10D is an eye diagram recorded under 10 Gbps modulation using 1537 nm illumination at minimum Vpp.

Figure 10E:
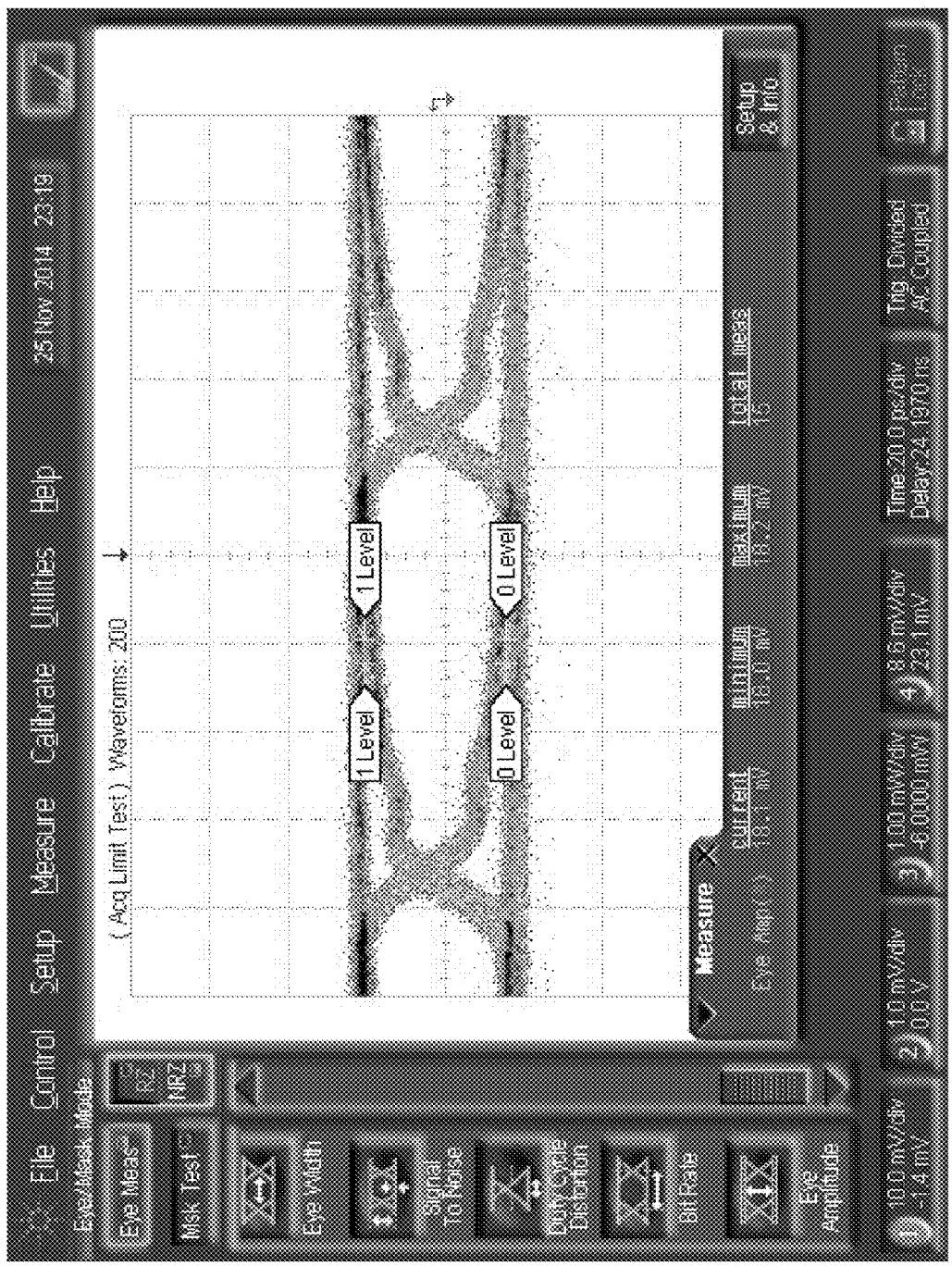
FIG. 10E is an eye diagram recorded under 10 Gbps modulation using 1543.5 nm illumination at maximum Vpp.

FIG. 10E is an eye diagram recorded under 10 Gbps modulation using 1543.5 nm illumination at maximum Vpp.

Figure 10F:
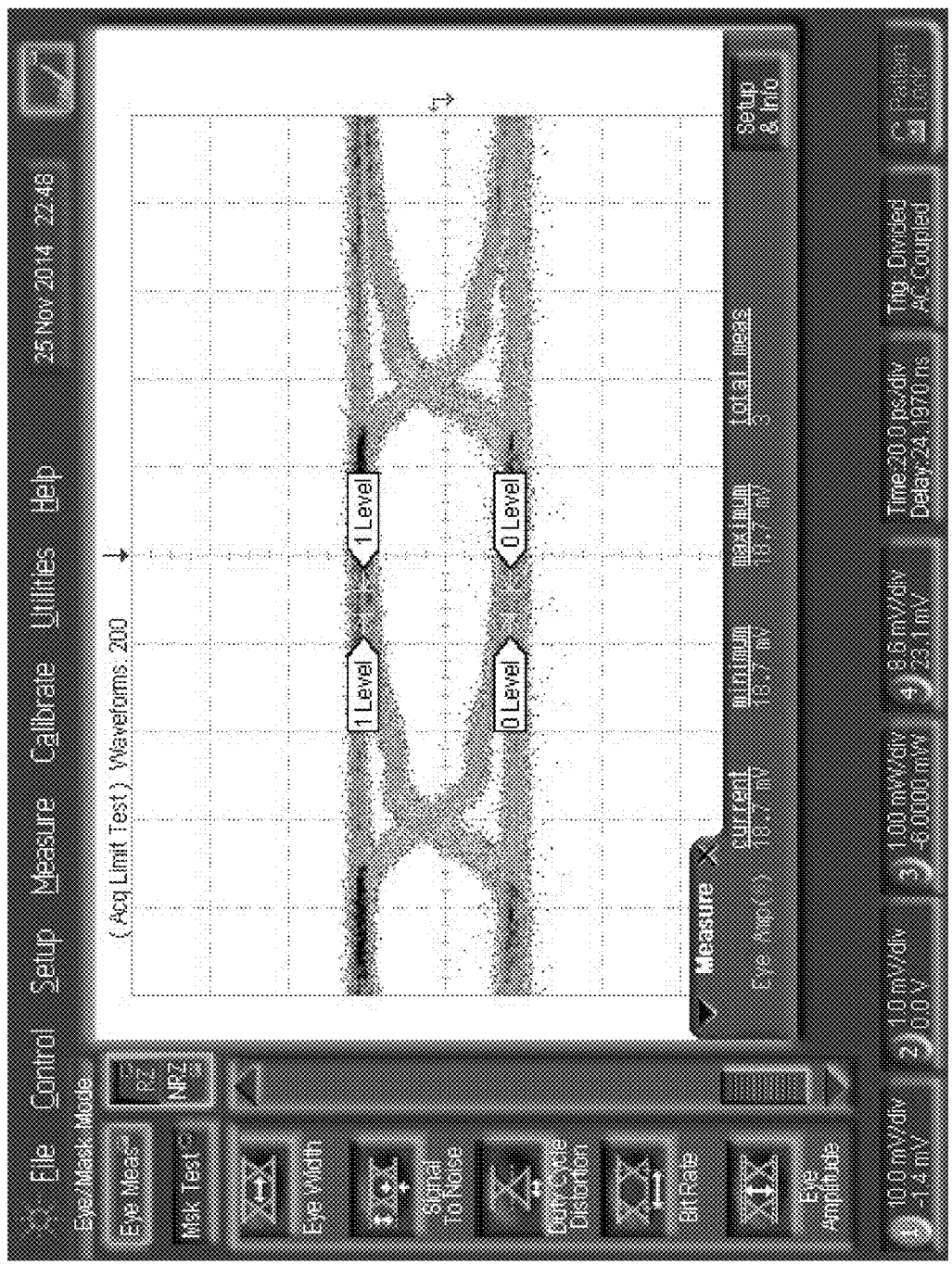
FIG. 10F is an eye diagram recorded under 10 Gbps modulation using 1543.5 nm illumination at minimum Vpp.

FIG. 10F is an eye diagram recorded under 10 Gbps modulation using 1543.5 nm illumination at minimum Vpp.

Figure 10G:
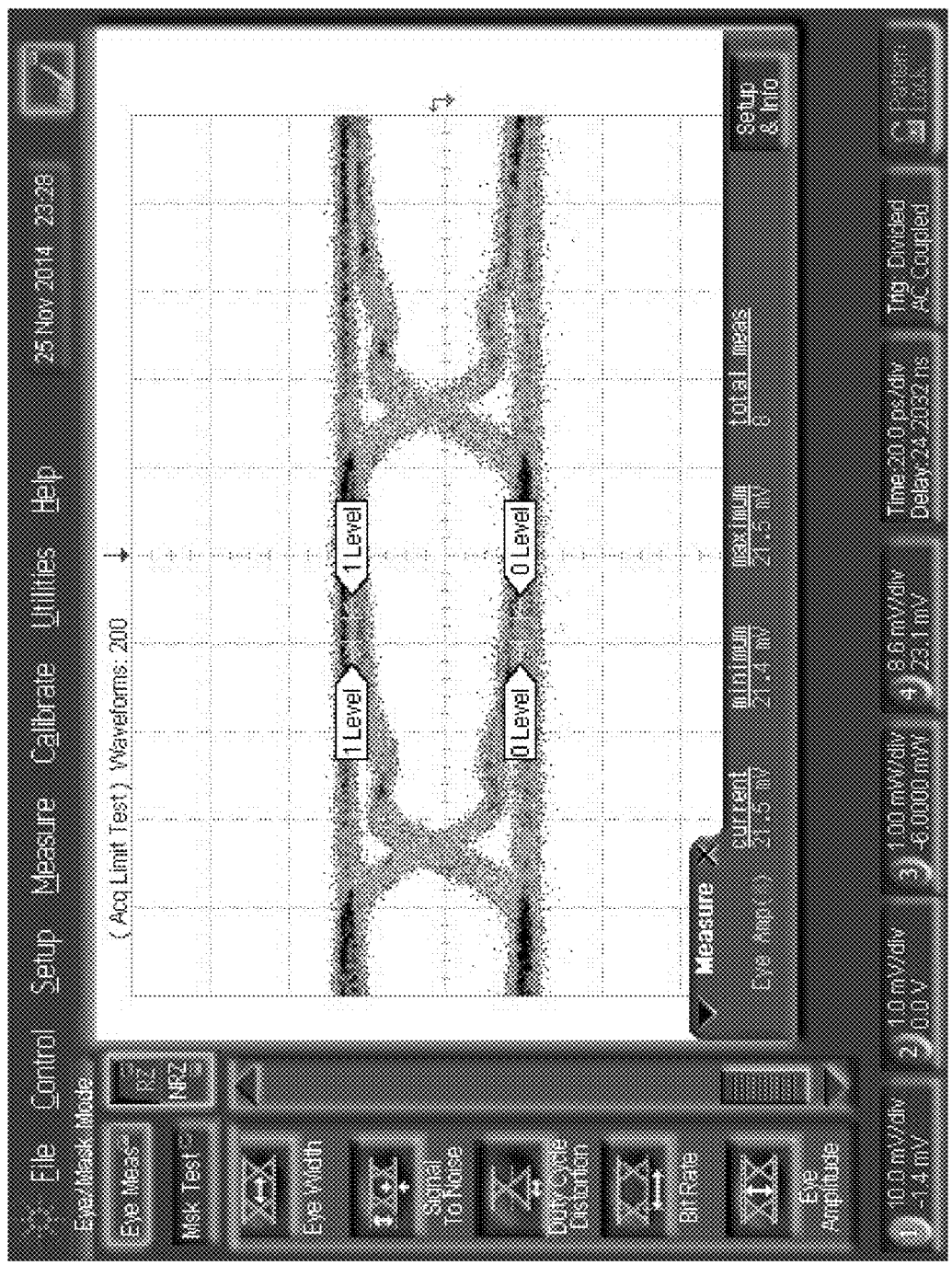
FIG. 10G is an eye diagram recorded under 10 Gbps modulation using 1550 nm illumination at maximum Vpp.

FIG. 10G is an eye diagram recorded under 10 Gbps modulation using 1550 nm illumination at maximum Vpp.

Figure 10H:
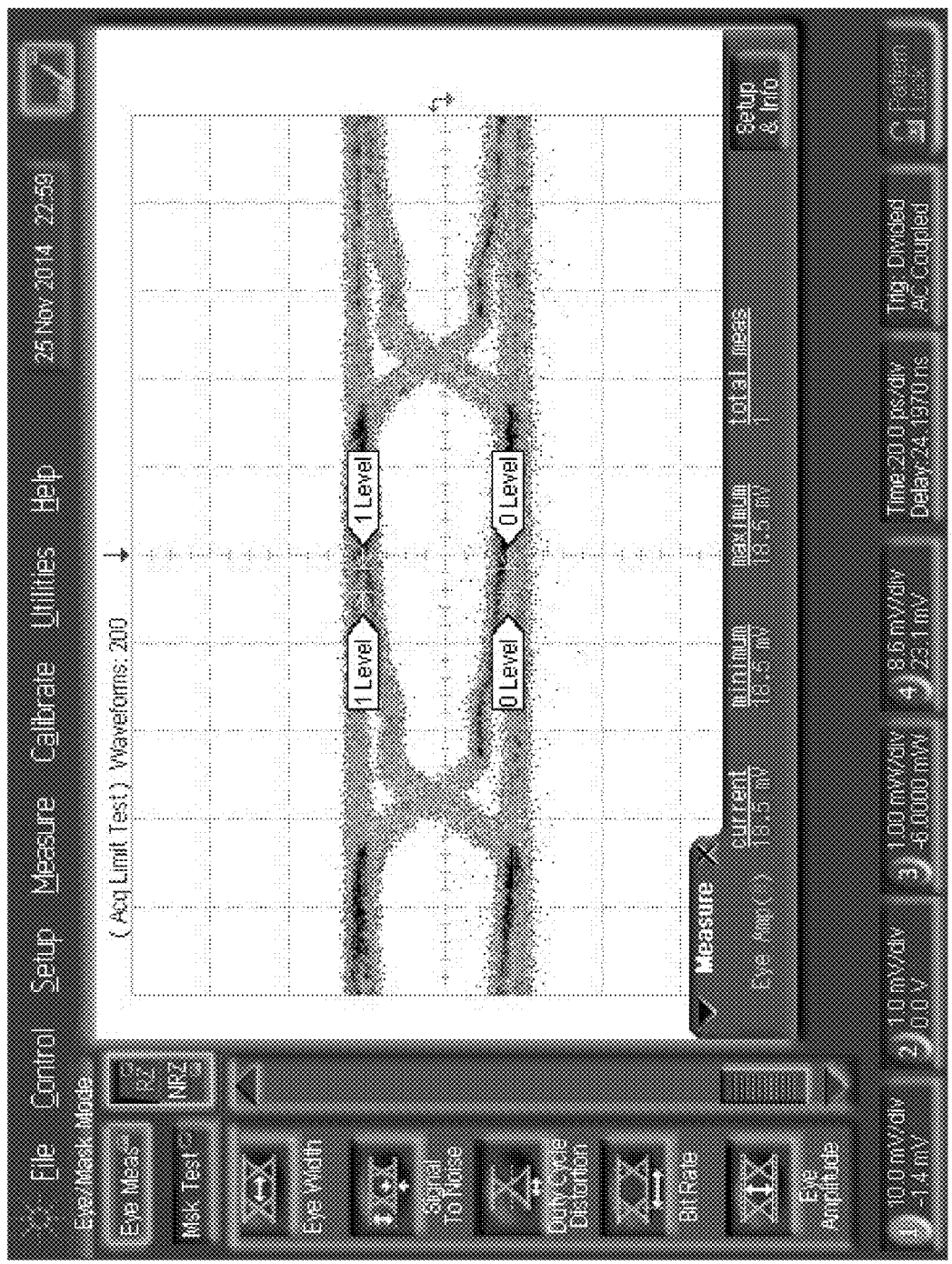
FIG. 10H is an eye diagram recorded under 10 Gbps modulation using 1550 nm illumination at minimum Vpp.

FIG. 10H is an eye diagram recorded under 10 Gbps modulation using 1550 nm illumination at minimum Vpp.

Eye diagram testing at 10 Gbps verified that the device is operational. By rotating the polarization state of the input signal, one can obtain the best case and worst case of eye diagram. The results showed that the worst-case polarization dependent loss (PDL) is 0.6 dB. The calculated PDL is listed in Table 1.

TABLE 1

| Wavelength (nm) | max Vpp (mV) | min Vpp (mV) | PDL (dB) |
| --- | --- | --- | --- |
| 1530.5 | 20.7 | 18 | −0.61 |
| 1537 | 19 | 18.7 | −0.07 |
| 1543.5 | 21.8 | 21.4 | −0.08 |
| 1550 | 20.6 | 19.5 | −0.24 |

In some embodiments, one may have an application that involves excitation of a TM mode on-chip for some purpose. In such an application, a plurality of PSRs may be employed, and the footprint can be further scaled down.

Figure 11:
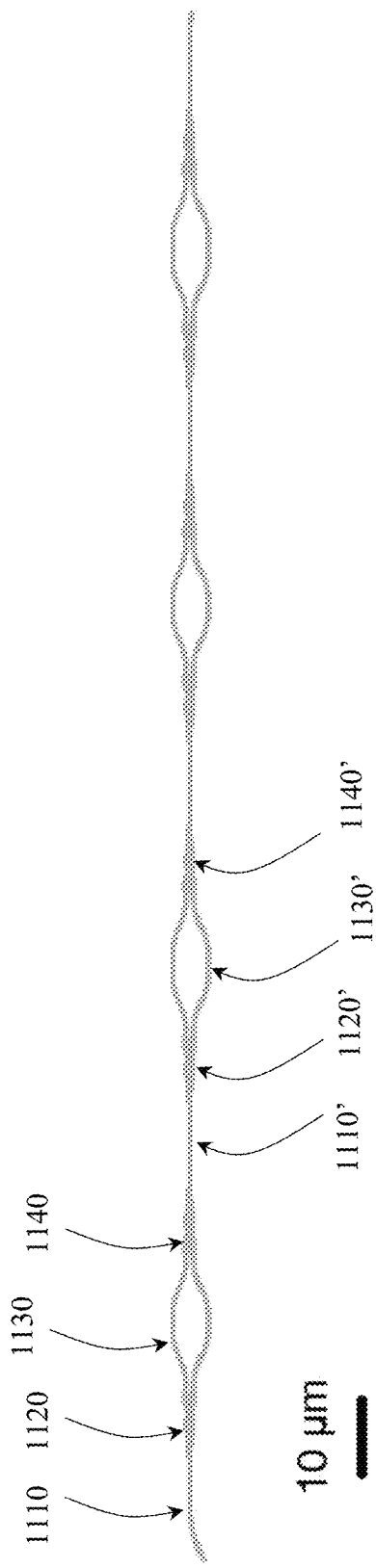
FIG. 11 is a diagram of an example of cascaded PSR structure.

FIG. 11 is a diagram of an example of a cascaded PSR structure. One application of such a structure is as an on-chip test structure. In FIG. 11, elements 1110 and 1110' are optical waveguides used to connect successive test modules in the integrated test structure. Element 1120 is a PSR, element 1130 is a structure similar to an MZI with no required elements provided to apply a modulation signal and element 1140 is a combiner based on the PSR 1120 operated in the reciprocal sense from 1120 used as a rotator and splitter, and 1110', 1120', 1130' and 1140' are another example of each of 1110, 1120, 1130 and 1140, respectively, in a serial connection. Elements 1120, 1130 and 1140 form a butt-coupled PSR pair. 1120', 1130' and 1140' are another example of a second butt-coupled PSR pair.

By cascading these pairs with different numbers, one can accurately extract the insertion loss of the device and thus measure the PDL. An embodiment of a test structure with 10 cascaded PSR pairs using the technology described herein will have an accumulated length that is shorter than 250 μm. Such a test structure can be easily provided in the spare space of a large system to enable device characterizations in wafer scale fabrication.

In another embodiment, the compact PSR design of FIG. 11 is very attractive for use in low-power, high-density system integration (such as in WDM systems) enabled by silicon micro-rings where the bend radius is smaller than 10 μm. In such systems, the footprint of an entire system is only several hundred square microns. Such systems are discussed in co-pending U.S. Patent Publication 2015/0104176 filed Oct. 15, 2014 in the name of Baehr-Jones et al, which is incorporated herein by reference. See also Yang Liu, Ran Ding, Yangjin Ma, Yisu Yang, Zhe Xuan, Qi Li Andy Eu-Jin Lim, Guo-Qiang Lo, Keren Bergman, Tom Baehr-Jones and Michael Hochberg "Silicon Mod-MUX-Ring transmitter with 4 channels at 40 Gb/s", OPTICS EXPRESS, Vol. 22, No. 13, pages 16431-16438, published 25 Jun. 2014, which is incorporated herein by reference.

By connecting the cascaded PSR test structure to grating couplers that work at TE0 (or TM0) mode, the insertion loss at TE0 (or TM0) can be accurately extracted. Thus PDL can be calculated as the difference of losses between the two modes. One can also connect the PSR test structures to edge couplers with on-chip or off-chip polarizers to extract an accurate insertion loss and PDL.

Further Description

In some embodiments of the PSR 200, 600 or 700 the substrate is Si on insulator, and in other embodiments it can be III-V materials. In some embodiments the top material is $SiO_2$ but in other embodiments it can be other suitable topping materials, such as Air, silicon nitride, or other materials having a suitable optical index.

Figure 12:
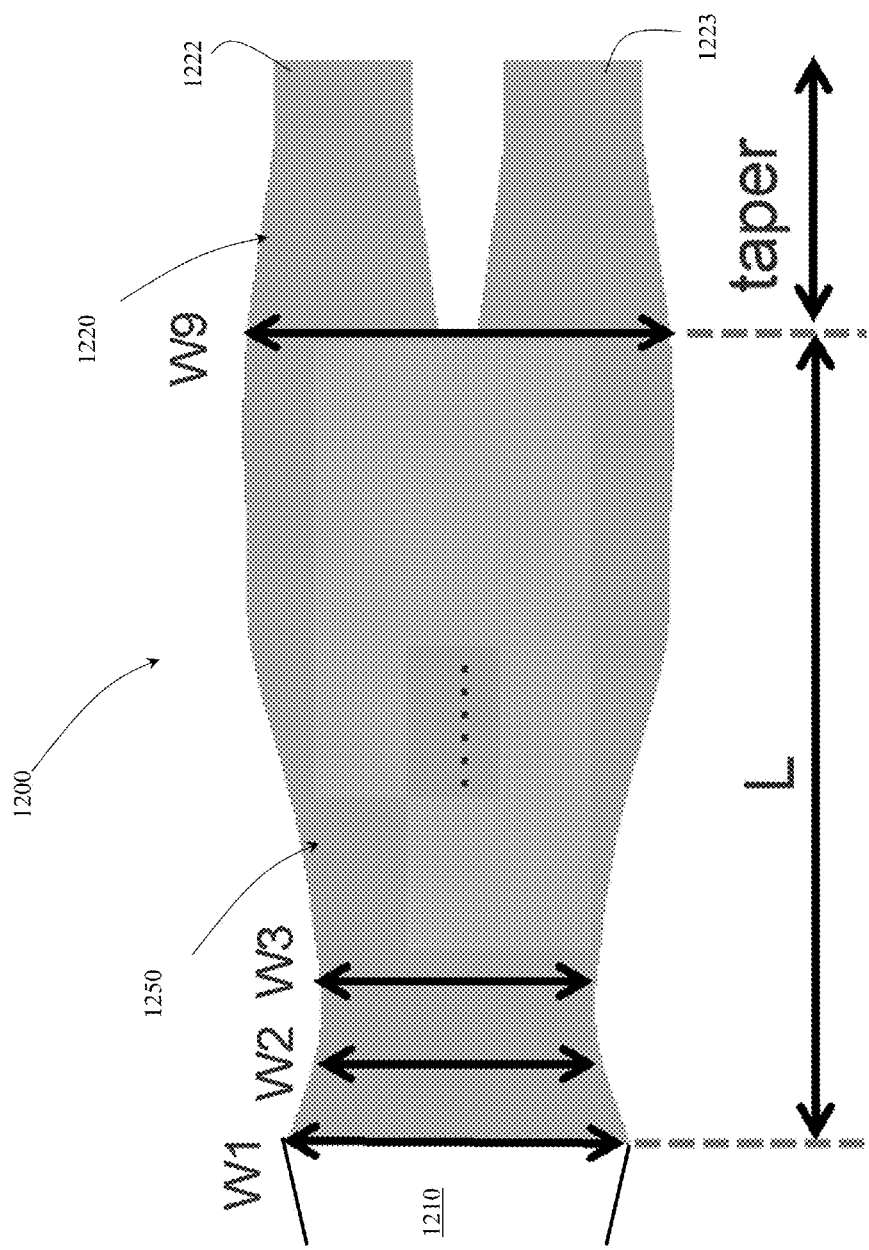
FIG. 12 is a schematic diagram of a PSR having a Y-junction, according to principles of the invention.

FIG. 12 is a schematic diagram of a PSR 1200 having a Y-junction, according to principles of the invention. The first part is a bi-layer taper rotator 1210 that rotates TM0 from a first port into TE1 but leaves TE0 undisturbed. The second part is a Y-junction splitter 1220 that splits both TE1 and TE0 into separate portions, and combines a first portion of the TE1 with a first portion of the TE0 for output a second port 1222, and second portion of the TE1 with a second portion of the TE0 for output a third port 1223, as hereinbefore defined. The PSR 1200 may be a passive reciprocal device, which also works in reverse to combine a pair of like polarized signals from the second and third ports 1222 and 1223 for launching as a mixed polarized signal onto an optical fiber from the first port 1202. No directional-coupler-like structure is involved for mode conversion and separation.

A PSR 1200 may be constructed by connecting these two parts 1210 and 1220 with a PDL tuning section 1250. By applying an optimization algorithm, such as the PSO, as defined in co-pending United States Patent Publication 2014/0178005 filed Nov. 29, 2013 in the name of Zhang et al, which is incorporated herein by reference, or the genetic algorithm, to the Y-junction 1220 geometry, the PDL can be highly controllable in design. By applying an optimization algorithm such as the PSO, or the genetic algorithm, to the bi-layer taper 1210, the device length can be dramatically decreased. A linear adiabatic taper also works if the footprint is not a constraint for a given application.

Typically, the shape of the TE0 and TE1 modes may be deformed, i.e. expanded and/or compressed, by the shape of the PDL tuning section 1250, e.g., gradual narrowing to widths less than the wide end of the tapered rotator 1210 and the splitter 1220 and/or broadening to widths greater than the wide end of the tapered rotator 1210 and the splitter 1220, whereby the phase may be delayed between the portions of the TE0 and TE1 modes during splitting. The PDL tuning second 1250 enables the PSR 1200 to generate a specific PDL, a minimum PDL, a higher splitting efficiency, or a minimum PDL with highest achievable splitting efficiency. Ideally, the PDL tuning section 1250 is symmetrical, about a longitudinal axis along the direction of light propagation, to provide equal splitting for the TE0 and TE1 modes.

Optimization Example

We now explain how one may optimize the PSR 1200 and show an example of its geometry (TE=0.4 dB, TM=0.3 dB).

FIG. 12 a schematic showing that the Y-junction geometry is segmented (which can be thought of as being digitized) into several segments. By engineering the widths (indicated in the embodiment shown in FIG. 12 as W1, W2, W3, . . . , W9), the splitting efficiency of TE1 and TE0 and thus the PDL can be controlled. The multimode PDL tuning region 1250, with a predetermined length, is divided into several equal segments, each having an independent width (W1 to Wn) perpendicular to and symmetrical about the longitudinal axis thereof. One or more segments W1 to Wn may have widths larger than the wide end of the tapered rotator 1210 and the splitter 1220 for expanding the intermediate TE0 and TE1 modes. One or more segments W1 to Wn may have widths smaller than the wide end of the tapered rotator 1210 and the splitter 1220 for contracting the intermediate TE0 and TE1 modes. Different width combinations have different efficiency for the TE0 and TE1 modes. A smoothing algorithm, such as interpolating spline, can be used to smooth the outline of the PDL tuning region 1250 to provide a gradual expansion and contraction between widths W1 to Wn.

As an example, for the geometry given in Table 2, the loss of PSR 1200 for TE0 and TM0 is 0.35 dB and 0.25 dB, respectively. The PDL can therefore be calculated 0.1 dB. Note that TM0 has lower loss than TE0. In other embodiments, one can use more or fewer than 9 segments to do this analysis.

TABLE 2

Y-junction geometry

| | W1 | W2 | W3 | W4 | W5 | W6 | W7 | W8 | W9 |
|---|---|---|---|---|---|---|---|---|---|
| Width (μm) | 1.25 | 1.1 | 1.018 | 1.108 | 1.257 | 1.47 | 1.534 | 1.513 | 1.6 |

Figure 13:
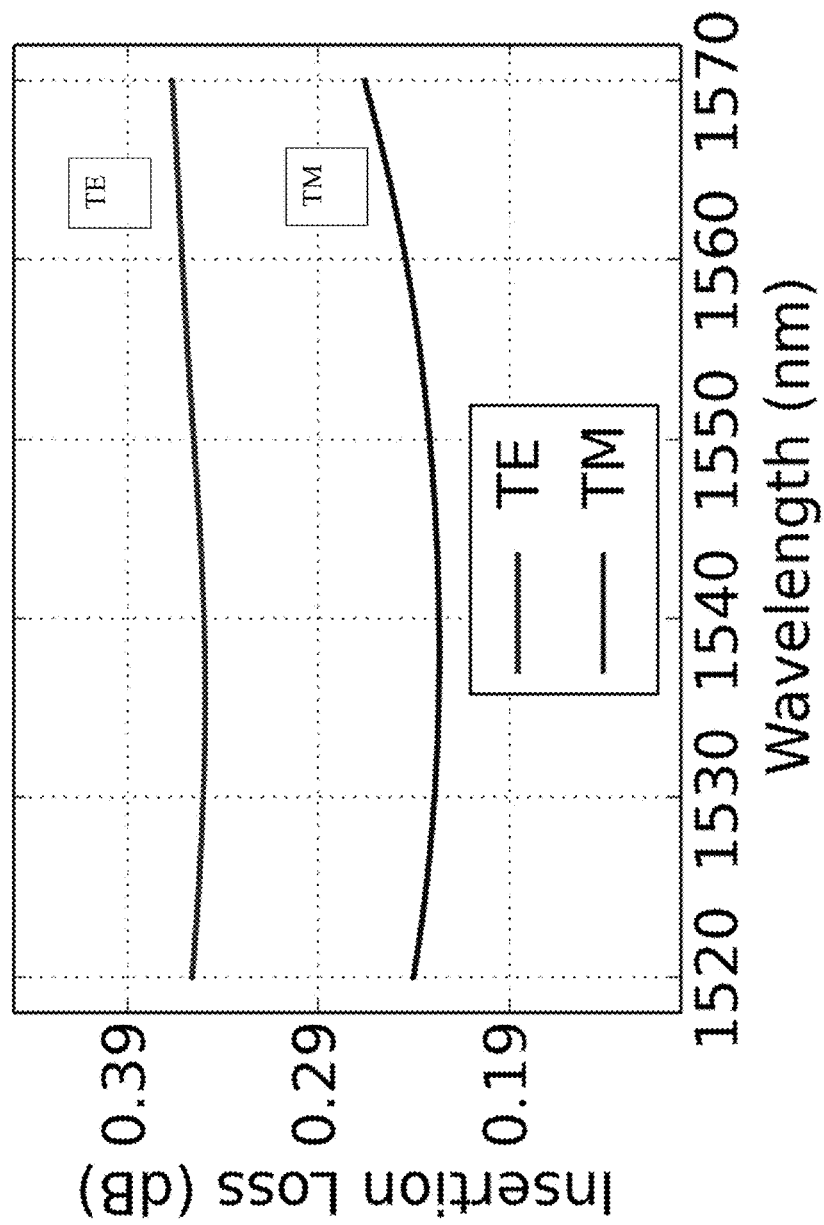
FIG. 13 is a graph of insertion loss as a function of wavelength for the TE mode and the TM mode.

FIG. 13 is a graph of insertion loss as a function of wavelength for the TE mode and the TM mode.

Applications

The PSR that are constructed according to principles of the invention can be used in a variety of applications, such as by way of example, WDM systems, receiver systems, polarization controllers, combinations of such applications, and other applications, such as, by way of example, reconfigurable optical add-drop multiplexers (ROADMs) and variable optical attenuators (VOAs).

Figure 14:
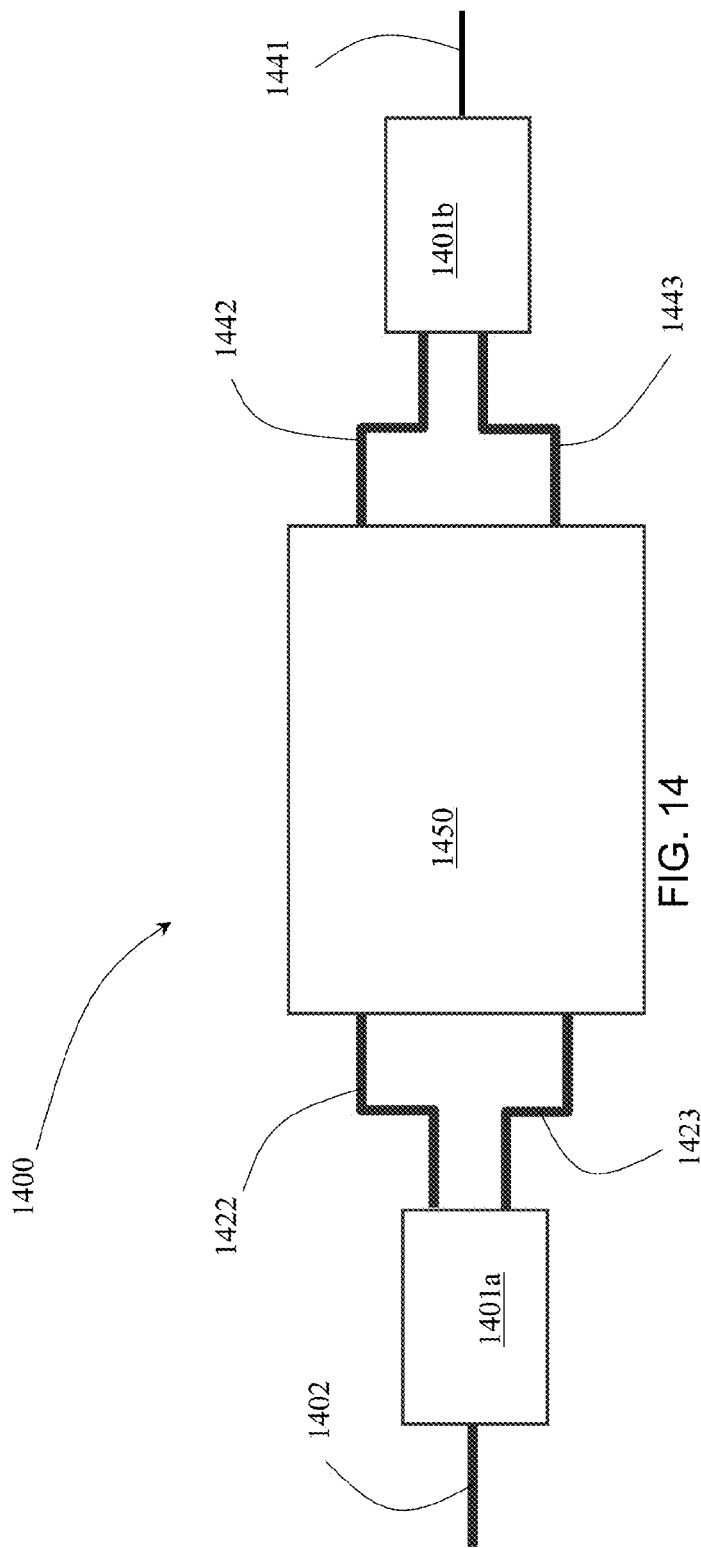
FIG. 14 is a schematic of an on-chip polarization controller that includes 2 PSR devices and an interposed phase or power tuning element.

In another embodiment, illustrated in FIG. 14, an on-chip polarization controller comprises a PSR 1400a followed by a phase and/or power tuning element 1450, e.g. by a 2×2 MMI and phase tuners. In the prior art, for example as described in Wesley D. Sacher, Tymon Barwicz, Benjamin J. F. Taylor, and Joyce K. S. Poon, "Polarization rotator-splitters in standard active silicon photonics platforms," OPTICS EXPRESS, Vol. 22, No. 4, 3777-3786, published 10 Feb. 2014, which is incorporated herein by reference, the PSR is about 500 μm which is about the same size as the thermal tuner. By reducing the device length of the PSR to 9 µm, which is much shorter than the 500 µm long thermal tuner, we can almost reduce the controller footprint by half. See also Wesley D. Sacher, Ying Huang, Liang Ding, Tymon Barwicz, Jared C. Mikkelsen, Benjamin J. F. Taylor, Guo-Qiang Lo, and Joyce K. S. Poon, "Polarization rotator-splitters and controllers in a Si3N4-on-SOI integrated photonics platform," OPTICS EXPRESS, Vol. 22, No. 9, 1167-11174, published 1 May 2014, which is incorporated herein by reference.

FIG. 14 is a schematic of an on-chip polarization controller that includes 2 PSR devices 1401a and 1401b and an interposed phase or power tuning element 1450 therebetween. An on-chip polarization controller 1400 can be constructed by connecting two butt-coupled PSRs 1401a and 1401b with the phase tuning and/or power tuning 1450 in between. The tuning can be single stage or multiple stages cascaded with 2×2 3 dB couplers. The first PSR 1401a receives light of mixed polarization at input port 1402, and outputs one or two combined signals at the same predetermined polarization at the second and third ports 1422 and 1423. The phase and/or power of each of the combined signals are adjusted in the phase and/or power tuner 1450, whereby when the combined signals are input the second PSR 1401b, via second and third ports 1442 and 1443, the second PSR 1401b can output an output signal of a desired polarization via first port 1441.

Figure 15:
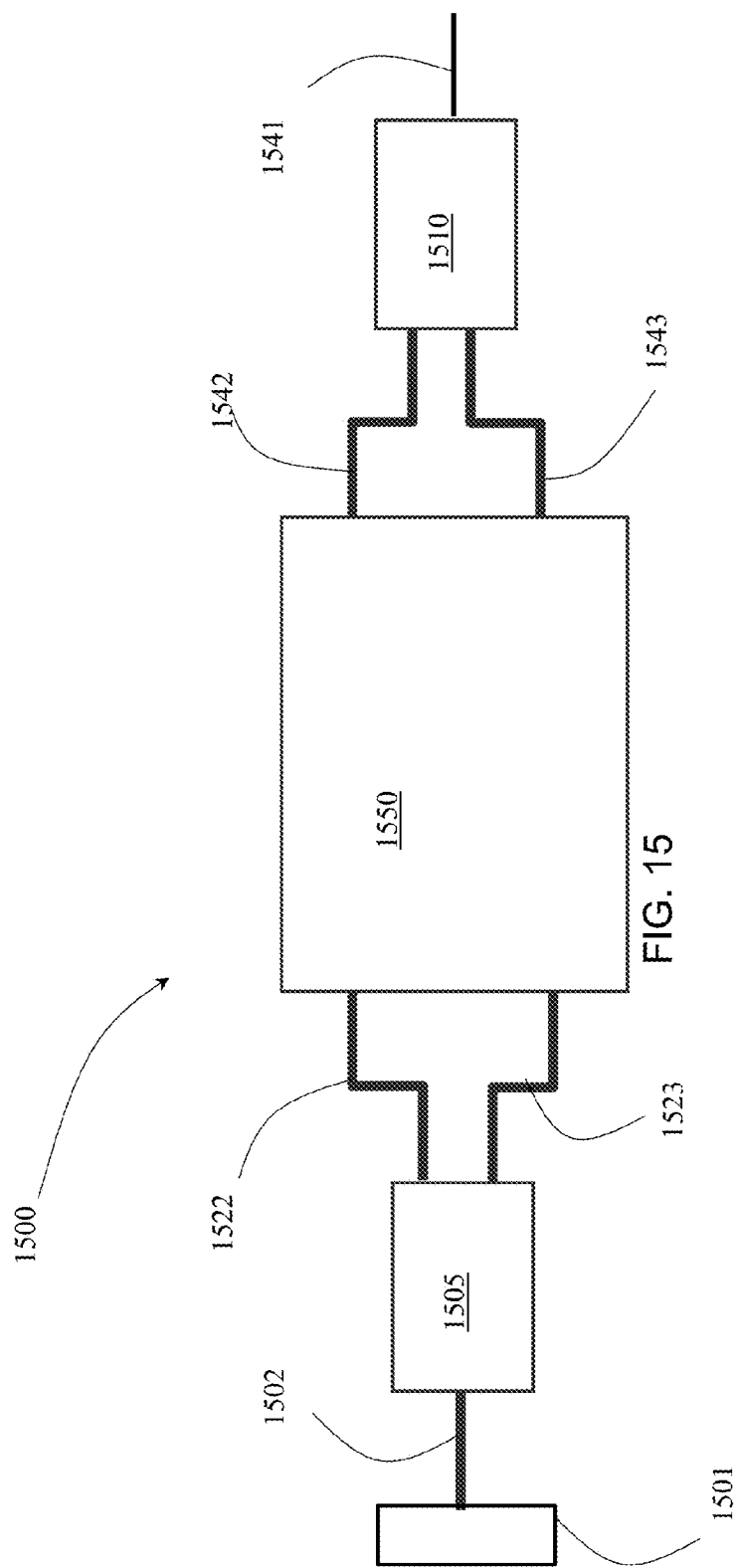
FIG. 15 is a schematic of a polarization diversity laser that includes two PSR devices.

FIG. 15 is a schematic diagram of an on-chip polarization diversity transmitter 1500, comprising a laser 1501 for generating an input signal, which is launched into a first PSR 1505, as hereinbefore described, for rotating and splitting the input signal into two like-polarized output signals, and for outputting the two output signals via the second and third ports 1522 and 1523. The two output signals are modulated by the modulator 1550, and then output second and third ports of a second PSR 1510. The second PSR 1510 then recombines and rotates the modulated output signals for output the first port 1541 of the second PSR 1510.

Figure 16:
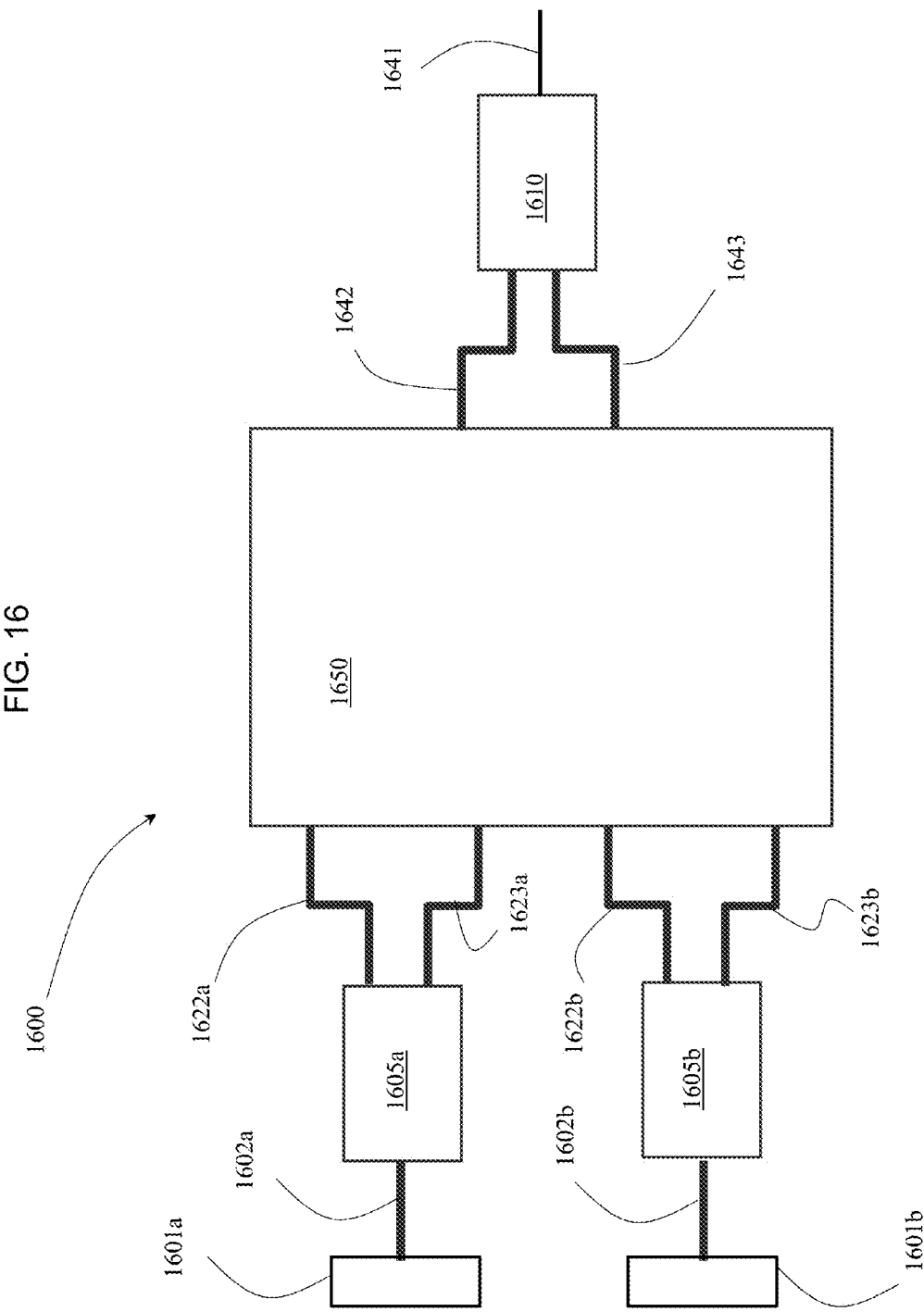
FIG. 16 is a schematic of a polarization diversity MUX/DEMUX that includes a plurality of PSR devices.

FIG. 16 is a schematic diagram of an on-chip polarization diversity MUX/DEMUX 1600. For multiplexing signals, the MUX/DEMUX 1600 comprises a plurality of light sources, e.g., lasers, 1601a and 1601b for generating input signals, which are launched into respective PSRs 1605a and 1605b, as hereinbefore described, for rotating and splitting the input signals into pairs of like-polarized output signals, and for outputting the pairs of output signals via the respective second and third ports 1622a/1622b and 1623a/1623b. The output signals from the second ports 1622a and 1622b are combined in a suitable first multiplexing device, e.g., AWG, while the output signals from the third ports 1623a and 1623b are combined in a suitable second multiplexing device, e.g., AWG. Then the two combined signals are combined and rotated in an input/output PSR 1610 for output as a combined WDM signal.

For demultiplexing, the MUX/DEMUX 1600 works in reverse. An input combined WDM signal is input the first port 1641 of the input/output PSR 1610 rotates the polarization of the TM0 and splits the input signal into two like-polarized combined signals. The first and second multiplexing devices separate each of the combined signals into constituent wavelengths, and direct each corresponding pair of constituent wavelengths to the second and third ports of one of the PSRs 1605a and 1605b. The PSRs 1605a and 1605b combine and rotate the polarization of the pairs of constituent wavelengths, and output each combined wavelength signal to one of the first ports 1602a and 1602b. The devices 1601a and 1601b may be a photodetector for converting the combined wavelength signal into an electrical signal or some other optical device for further transmitting or adjusting the individual wavelength signals.

Figure 17:
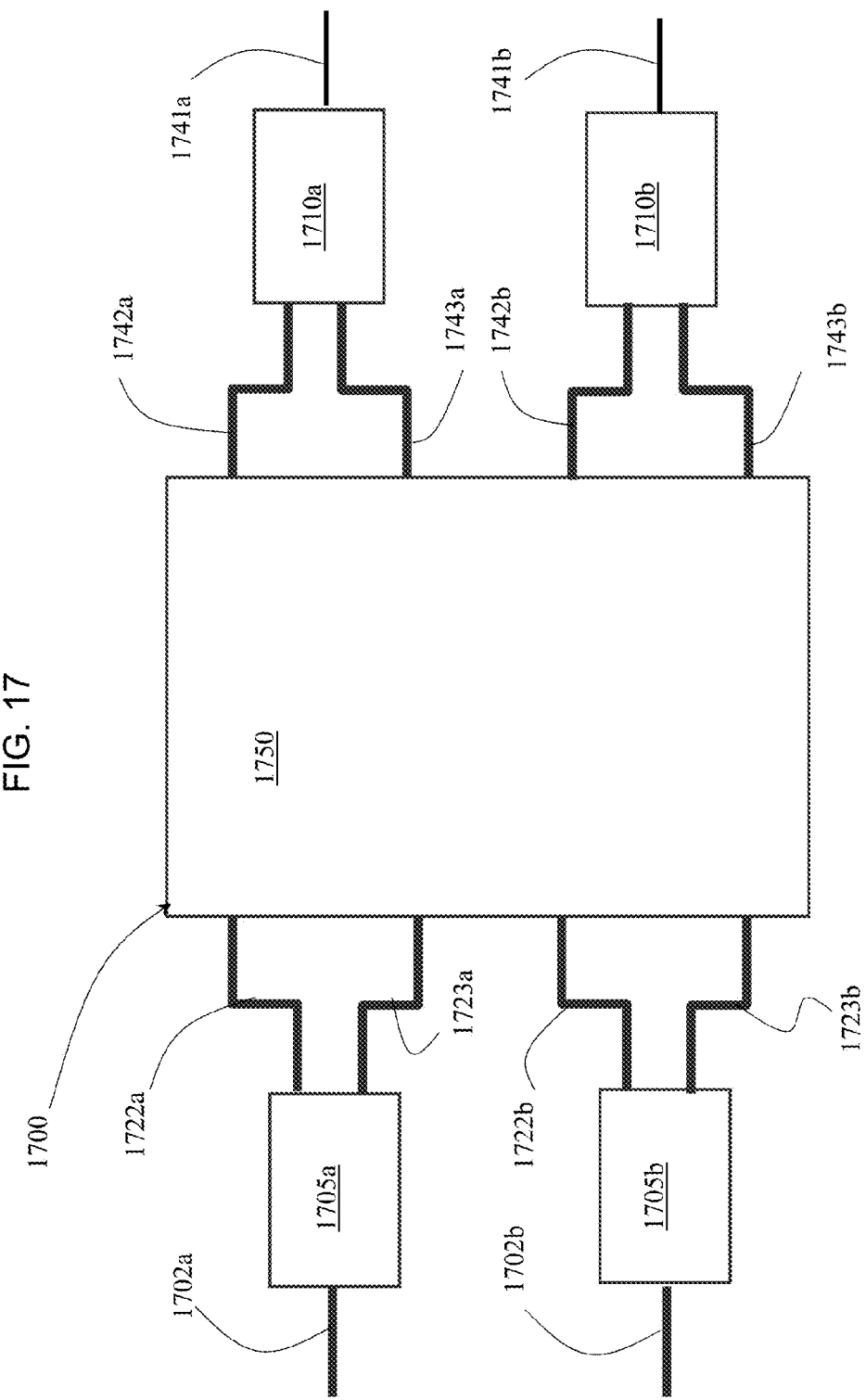
FIG. 17 is a schematic of a polarization diversity switch that includes a plurality of PSR devices.

FIG. 17 illustrates a schematic of a polarization diversity switch 1700 including a plurality of first PSR's 1705a and 1705b, and a plurality of second PSR's 1710a and 1710b representing input/output ports for a switch core 1750. Individual wavelength or WDM signals may be input the first or second PSR's, in which each signal has the TM0 mode rotated to TE0, and then both TE0 modes separated into a pair of like-polarized signals for output separately at the second and third ports 1722a/1722b/1742a/1742b and 1723a/1723b/1743a/1743b, respectively, which are optically coupled to the switch core 1750. Within the switch core 1750, each pair of like-polarized signals may be separated further into pairs of individual wavelengths signals by a suitable DEMUX, as hereinbefore described. If necessary, the individual pairs of wavelength signals may then be directed to one of a plurality of suitable MUX devices corresponding to the desired input/output port for combination into a pair of combined WDM output signals. The pair of combined WDM output signals or a pair of individual wavelength signals is then directed by the switch core 1750 to the desired input/output port, i.e., PSR 1705a, 1705b, 1710a, 1710b, for combining and rotating into a single output signal for outputting the corresponding first port 1702a, 1702b, 1741a and 1741b.

Design and Fabrication

Methods of designing and fabricating devices having elements similar to those described herein, including high index contrast silicon waveguides, are described in one or more of U.S. Pat. Nos. 7,200,308, 7,339,724, 7,424,192, 7,480,434, 7,643,714, 7,760,970, 7,894,696, 8,031,985, 8,067,724, 8,098,965, 8,203,115, 8,237,102, 8,258,476, 8,270,778, 8,280,211, 8,311,374, 8,340,486, 8,380,016, 8,390,922, 8,798,406, and 8,818,141, each of which documents is hereby incorporated by reference herein in its entirety.

Definitions

As used herein, the term "optical communication channel" is intended to denote a single optical channel, such as light that can carry information using a specific carrier wavelength in a wavelength division multiplexed (WDM) system.

As used herein, the term "optical carrier" is intended to denote a medium or a structure through which any number of optical signals including WDM signals can propagate, which by way of example can include gases such as air, a void such as a vacuum or extraterrestrial space, and structures such as optical fibers and optical waveguides.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the various embodiments illustrated in the drawings, it will be understood by one skilled in the art that various changes in detail may be affected therein without departing from the spirit and scope of the invention, and it is not intended that the present teachings be limited to such embodiments.

What is claimed is:

1. An optical device, comprising:
    a first integrated optical apparatus comprising:
        a first port for receiving an optical signal comprising first and second fundamental modes with first and second orthogonal polarizations, respectively;
        a mode converter-configured to pass the first fundamental mode with the first polarization as a first intermediate fundamental mode with the first polarization, and configured to convert the second fundamental mode with the second polarization to a second intermediate first-order mode with the first polarization, comprised of first and second out of phase fundamental mode portions with the first polarization;
        a splitter configured to split said first intermediate fundamental mode into first and second in phase fundamental mode portions with the first polarization, and to split said second intermediate first-order mode into the first and second out of phase portions with the first polarization, and configured to mix the first portions of the first intermediate fundamental mode and the second intermediate first-order mode to produce a first output fundamental mode signal with the first polarization, and to mix the second portions of the first intermediate fundamental mode and the second intermediate first-order mode to produce a second output fundamental mode signal with the first polarization;
        a tuner for tuning PDL of the first and second output fundamental mode signals, the tuner including gradually increasing and/or decreasing widths for expanding and/or compressing the first and second intermediate modes;
        a second port for outputting the first output fundamental mode signal; and
        a third port for outputting the second output fundamental mode signal.

2. The device according to claim 1, wherein the first integrated optical apparatus is reciprocal, whereby the splitter is also configured to receive at said second and third ports a first and a second fundamental-mode signal, respectively, with the first polarization, and whereby the mode converter is also configured to provide at said first port an output signal comprising first and second fundamental modes with orthogonal polarizations.

3. The device according to claim 1, wherein said first portions of the second intermediate first-order mode and the first intermediate fundamental mode have a relative phase of zero degrees.

4. The device according to claim 1, wherein said second portions of the second intermediate first-order mode and the first intermediate fundamental mode have a relative phase of substantially 180°.

5. The device according to claim 1, wherein said second portions of the second intermediate first-order mode and the first intermediate fundamental mode have a relative phase of more than 0° and less than 180°.

6. The device according to claim 1, further comprising second and third integrated optical apparatuses, substantially the same as the first integrated optical apparatus, connected in series with the first integrated optical apparatus;
    wherein second and third ports of the first integrated optical apparatus are connected to said second and third ports, respectively, of the second first integrated optical apparatus; and
    wherein first ports of the second and the third integrated optical apparatuses are connected.

7. The device according to claim 1, further comprising an edge coupler for coupling the waveguide structure to an optical fiber or waveguide;
    wherein the tuner is configured to adjust a phase of the first intermediate fundamental mode or the second intermediate first-order mode to compensate for a polarization dependent loss of the edge coupler.

8. The device according to claim 1, further comprising is a directional coupler remote from the first integrated optical apparatus;
    wherein the tuner is configured to adjust a phase of the first intermediate fundamental mode or the second intermediate first-order mode to compensate for a polarization dependent loss of the directional coupler.

9. The device according to claim 1, further comprising a bidirectional photodetector including a first waveguide optically coupled to the second port, and a second waveguide optically coupled to the third port for generating a polarization insensitive reading of the optical signal.

10. The device according to claim 1, further comprising:
    a first WDM demultiplexor coupled to the second port for demultiplexing the first output signal into constituent wavelengths;
    a second WDM demultiplexor coupled to the third port for demultiplexing the second output signal into constituent wavelengths corresponding to the first WDM demultiplexor;
    a plurality of bidirectional photodetectors, one for each wavelength, each bidirectional photodetector configured to receive corresponding wavelengths from each of the first and second WDM demultiplexors for generating a polarization insensitive reading for each wavelength.

11. The device according to claim 1, further comprising:
    a phase and/or power tuning device optically coupled to the second and third ports for adjusting the phase and/or power of the first and second output signals;
    a second integrated optical device, substantially the same as the first integrated optical device, including second and third ports optically coupled to the phase and/or power tuning device, and a first port for outputting a polarization-adjusted output signal.

12. The device according to claim 1, wherein the tuner includes an expanded segment having a width greater than an output of the mode converter and an input of the splitter for expanding the first and second intermediate modes.

13. The device according to claim 1, wherein the tuner includes a contracted segment having a width less than an output from the mode converter and an input to the splitter for contracting the first and second intermediate modes.

14. The device according to claim 12, wherein the tuner also includes a contracted segment having a width less than the output from the mode converter and the input to the splitter for contracting the first and second intermediate modes.

15. The device according to claim 1, further comprising:
a light source for generating the input signal optically coupled to the first port;
a modulator optically coupled to the second and third ports for modulating the first and second output signals forming modulated first and second output signals;
a second integrated optical device, substantially the same as the first integrated optical device, for combining the first and second modulated output signals, and for rotating the polarization of a portion thereof to form orthogonally polarized modes in a modulated output signal, the a second integrated optical device including additional second and third ports optically coupled to the modulator, and an additional first port for outputting the modulated output signal with orthogonally polarized modes.

16. The device according to claim 1, further comprising:
a first light source for generating the input signal optically coupled to the first port;
a second light source for generating an additional input signal comprising first and second fundamental modes with first and second orthogonal polarizations;
a second integrated optical device, substantially the same as the first integrated optical device, for receiving the additional input signal, for rotating the polarization of the second fundamental mode of the additional input signal, for dividing the additional input signal into a pair of additional fundamental mode output signals, with the first polarization, and for outputting the additional pair of output signals;
a first multiplexing device for combining one of the first and second output signals and one of the additional pair of output signals into a first multiplexed signal;
a second multiplexing device for combining another of the first and second output signals and another of the additional pair of output signals into a second multiplexed signal;
a third integrated optical device, substantially the same as the first integrated optical device, for combining the first and second multiplexed signals, and for rotating a portion thereof to form orthogonally polarized modes in a multiplexed output signal, the third integrated optical device including second and third ports optically coupled to the first and second multiplexing devices, and a first port for outputting the multiplexed output signal.

17. The device according to claim 1, further comprising:
a switch core optically coupled to the second and third ports for receiving the first and second output signals, and for directing the first and second output signals to a selected one of a plurality of switch output ports;
a plurality of integrated optical devices, substantially the same as the first integrated optical device, each one optically coupled to a respective switch output port for combining the first and second output signals, and for rotating a portion thereof to form orthogonally polarized modes in a combined switched output signal, each additional integrated optical device including second and third additional ports optically coupled to a respective switch output port, and a first port for outputting the combined switched output signal.

18. A method of polarization rotating and splitting in a waveguide structure of a first integrated optical device comprising:
receiving an optical signal comprising first and second fundamental modes with first and second orthogonal polarizations, respectively, via a first port;
passing the first fundamental mode with the first polarization through a first region as a first intermediate fundamental mode with the first polarization, while converting the second fundamental mode with the second polarization to an a second intermediate first-order mode with the first polarization, comprised of first and second out of phase fundamental mode portions with the first polarization;
splitting the first intermediate fundamental mode in a second region into first and second in phase fundamental mode portions with the first polarization, while splitting the second intermediate first-order mode into the first and second out of phase portions with the first polarization, and
mixing the first portions of the first intermediate fundamental mode and the second intermediate first-order mode in the second region to produce a first output fundamental mode signal with the first polarization, while mixing the second portions of the first intermediate fundamental mode and the second intermediate first-order mode to produce a second output fundamental mode signal with the first polarization; and
tuning PDL of the first and second output fundamental mode signals in a third region including gradually increasing and/or decreasing widths for expanding and/or compressing the first and second intermediate modes;
outputting the first output fundamental mode signal via a second port; and
outputting the second output fundamental mode signal via a third port.

19. The method according to claim 18, further comprising generating a polarization insensitive reading of the optical signal with a bidirectional photodetector optically coupled between to the second and third ports.

20. The method according to claim 18, further comprising:
modulating the first and second output signals forming modulated first and second output signals; and
in a second integrated optical device, substantially the same as the first integrated optical device, combining the first and second modulated output signals, and rotating the polarization of a portion thereof to form orthogonally polarized modes in a modulated output signal.

* * * * *